United States Patent [19]
Uekane et al.

[11] Patent Number: 5,559,554
[45] Date of Patent: Sep. 24, 1996

[54] MONITOR SCREEN-INTEGRATED VIDEO CAMERA

[75] Inventors: Kentarou Uekane, Yaita; Hiroshi Ikeda, Tochigi, both of Japan

[73] Assignee: Sharp Kabushiki Kaisha, Osaka, Japan

[21] Appl. No.: 277,045

[22] Filed: Jul. 19, 1994

[30] Foreign Application Priority Data

Dec. 1, 1993 [JP] Japan .................................. 5-302017

[51] Int. Cl.$^6$ .................................................. H04N 5/225
[52] U.S. Cl. ........................... 348/333; 348/373; 348/589
[58] Field of Search ...................................... 348/333, 334, 348/358, 335, 207, 373, 376, 239, 589, 375, 211

[56] References Cited

U.S. PATENT DOCUMENTS

| | | | |
|---|---|---|---|
| 4,550,343 | 10/1985 | Nakatani | 348/375 |
| 4,608,603 | 8/1986 | Johnson | 348/239 |
| 4,757,388 | 7/1988 | Someya et al. | 348/211 |
| 5,442,453 | 8/1995 | Takagi et al. | 348/374 X |

FOREIGN PATENT DOCUMENTS

| | | |
|---|---|---|
| 0581286A | 2/1994 | European Pat. Off. . |
| 60-22877A | 2/1985 | Japan . |
| 61-150474 | 7/1986 | Japan . |
| 62-35329 | 2/1987 | Japan . |
| 62-36985 | 2/1987 | Japan . |
| 63-27169 | 2/1988 | Japan . |
| 63-061235 | 3/1988 | Japan . |
| 1106581 | 4/1989 | Japan . |
| 3003579 | 1/1991 | Japan ............................... H04N 5/46 |

*Primary Examiner*—Wendy Garber

[57] ABSTRACT

An address for a character generator ROM is composed of an upper readout address portion which is a character code loaded from a text memory for storing texts edited by a microcomputer and a lower readout address portion which is a value of a counter. Output data from the character generator ROM accessed by the above addresses are loaded in parallel by left-shift and right-shift registers. The output data is serialized by the left-shift register to form character pattern data, which in turn is superimposed on a video picture signal to be outputted to a VTR portion. In response to a self-image picture taking mode signal, one output is selected by a selector from the output of the left-shift register and the output of the right-shift register. The thus selected output is superimposed over the video picture signal to be delivered to a monitor screen driver circuit. The monitor screen driver circuit horizontally inverts the scanning direction in order to display a mirror-image of the picture on the monitor screen when the video camera is operated in the self-image picture taking state.

29 Claims, 15 Drawing Sheets

CONSTRUCTIONAL DIAGRAM OF EMBODIMENT

PRIOR ART EXAMPLE OF TEXT MEMORY STORAGE

PRIOR ART DISPLAY EXAMPLE ON MONITOR SCREEN
(IN NORMAL PICTURE-TAKING STATE)

PRIOR ART DISPLAY EXAMPLE ON MONITOR SCREEN
(IN SELF-IMAGE PICTURE-TAKING STATE I)

PRIOR ART DISPLAY EXAMPLE ON MONITOR SCREEN
(IN SELF-IMAGE PICTURE-TAKING STATE II)

CONSTRUCTIONAL DIAGRAM OF EMBODIMENT

Fig. 8 EMBODIED SUPERIMPOSITION CONTROL CIRCUIT

EMBODIMENT OF TEXT MEMORY STORAGE
(IN NORMAL PICTURE-TAKING STATE)

DISPLAY DATA (CHARACTER : 1
 OUTPUT MEANS :
     MONITOR AND VTR
 COLOR : WHITE)

DISPLAY DATA (CHARACTER : B
 OUTPUT MEANS :
     MONITOR
 COLOR : RED)

DISPLAY DATA (CHARACTER : F
 OUTPUT MEANS :
     MONITOR
 COLOR : GREEN)

EMBODIMENT OF TEXT MEMORY STORAGE
(IN SELF-IMAGE PICTURE-TAKING STATE I)

EMBODIMENT OF TEXT MEMORY STORAGE
(IN SELF-IMAGE PICTURE-TAKING STATE II)

EMBODIED DISPLAY EXAMPLE ON MONITOR SCREEN
(IN NORMAL PICTURE-TAKING STATE)

EMBODIED DISPLAY EXAMPLE ON MONITOR SCREEN
(IN SELF-IMAGE PICTURE-TAKING STATE I)

HORIZONTALLY INVERTED EXAMPLE

NON-INVERTED CHARACTER        HORIZONTALY INVERTED CHARACTER

VERTICALLY INVERTED EXAMPLE

NON-INVERTED CHARACTER        VERTICALLY INVERTED CHARACTER

EMBODIED DISPLAY EXAMPLE ON MONITOR SCREEN
(IN SELF-IMAGE PICTURE-TAKING STATE II)

5,559,554

MONITOR SCREEN-INTEGRATED VIDEO CAMERA

BACKGROUND OF THE INVENTION

1. Field of the Invention

The present invention relates to a home video camera equipped with a monitor screen and in particular to a monitor screen-integrated video camera which has a joint portion allowing a camera portion to rotate relative to a monitor portion so that the camera lens can be oriented in both the same and opposite directions with the face of the monitor screen.

2. Description of the Prior Art

Home video cameras are also called as a camera-integrated video tape-recorder, and this type of products, that is, including a VTR portion for allowing a video cassette tape to record pictures as well as a camera for taking pictures, have now been becoming popular in the market.

Now, a typical conventional monitor screen-integrated video camera will be explained with reference to drawings.

FIG.1 is an overall block diagram showing a prior art example of a monitor screen-integrated video camera.

In FIG.1, the conventional video camera has a camera portion 1 for picking up a picture of objects, a monitor portion 2 for displaying the picture of the objects that have been taken, and a joint portion 3 for jointing camera portion 1 and monitor portion 2 and allowing relative rotation of one to another.

Camera portion 1 includes a camera lens 4 and a picture pickup circuit 5 which converts optical images of objects formed by camera lens 4 into video picture signals to be outputted to monitor portion 2.

Monitor portion 2 includes: a monitor screen 6 such as of a liquid crystal panel or the like for displaying the picture of objects taken; a display driver circuit 7 for driving monitor screen 6; a VTR portion 8 for recording video picture signals on an unillustrated video cassette tape and reproducing video picture signals from a video cassette tape; a superimposition controlling circuit 209 for superimposing a date, operation information, caution notice and the like over the video pictures to be displayed on monitor screen 6 and/or to be recorded on the video cassette tape; and a microcomputer 210 for controlling the entire video camera.

Joint portion 3 has a rotational angle detecting switch 11 that detects a relative rotational angle of camera portion 1 to monitor portion 2. The rotational angle detecting switch 11 outputs to microcomputer 210 a self-image picture-taking mode signal that indicates that the camera is set in a position for picking up self-image when both camera lens 4 and monitor screen 6 are oriented to the same object.

Microcomputer 210 may instruct display driver circuit 7 to display a horizontally inverted, mirror-image of the pickup picture with reference to the self-image picture-taking mode signal.

Next, FIG.2 is an overall block diagram showing a superimposition controlling circuit 209 as a part of monitor portion 2.

Superimpose controlling circuit 209 comprises a command register 101, a data register 102, a command decoder 303, a text memory 110, a row-counter 111, a column-counter 112, a row-address selector 113, a column-address selector 114, a character code register 120, a character generator ROM 121, a ROM address counter 322, a left-shift register 123, AND-gates 126, 127, video picture signal adding circuits 128, 129, a clock oscillator (OSC) 130, a 1/m-divider 131 and a 1/n-divider 132.

Next, each component of the superimposition controlling circuit will be now described in further detail.

Command register 101 and data register 102 are each composed of a series input/parallel output shift register and receive command and display character data associated with the command, respectively, both of which are serially transmitted from microcomputer 210, and output parallel command and data, respectively.

Command decoder 303 decodes the command accepted by command register 101 and generates a control timing signal.

Text memory 110 consists of memory sections arranged in a 12-row×24-column matrix form for filling one full-frame region of the screen. Each of the memory sections can store a character code for one character and information associated with the character. Information to be written in text memory 110 is display character data consisting of character codes and associated information with characters held in data resistor 102, and is written in memory sections designated by corresponding commands.

An address in text memory 110 is designated by a two-way selector, that is, consisting of a row-address selector 113 and a column-address selector 114. Upon writing data into text memory 110, selectors 113 and 114 are designated by a writing address associated with the data to be written in and stored in the command register, to thereby form a text memory address. When data in text memory 110 is to be read out, an address in the text memory is generated by selecting row and column addresses with the help of a row-counter 111 and a column-counter 112 that count cyclically.

Column-counter 112 for providing a column-address (or a horizontal-direction address) in text memory 110 is reset by a horizontal synchronizing signal (HSYNC) and counts signals $\phi_1$ that are formed by dividing an output signal $\phi_0$ from clock oscillator (OCS) 130 by means of 1/n-divider circuit 132. Here, a period of $\phi_0$ is a time corresponding to a horizontal length of one pixel in forming character patterns that are read out from the character generator ROM and 'n' is a number in the horizontal direction of the pixels constituting one character.

Row-counter 111 for providing a row-address (or a vertical-direction address) in text memory 110 is reset by a vertical synchronizing signal (VSYNC) and counts signals that are formed by dividing the horizontal synchronizing signal (HSYNC) by means of 1/m-divider circuit 131. Here, 'm' is a number in the vertical direction of the pixels constituting one character.

Character code register 120 stores the character codes and associated modifying information therewith which are read out from text memory 110.

Character generator ROM 121 converts a character code into a display pattern of m dots×n dots. A readout address in character generator ROM 121 consists of an upper bit portion indicating a character code in character code register 120 and a lower bit portion which is provided from ROM address counter 322.

ROM address counter 322 counts horizontal synchronizing signals to provide a lower bit portion for the readout address in character generator ROM 121 and the thus formed addresses are successively used for reading out one character pattern in the vertical direction.

Left-shift register 123 is a readout register for character generator ROM 121. After read-out data sets have been set in parallel in the left-shift register 123, the data sets are shifted based on clock signal $\phi_0$ to be converted into serial data.

Character pattern data delivered serially from left-shift register 123 is supplied to both AND-gates 126 and 127 on their one input side. Output indicating bits 120-2, 120-3 for the modifying information in character code register 120 are connected to respective other input terminals of AND-gates 126 and 127. In accordance with ON/OFF state in output indicating bits 120-2 and 120-3, the output from AND-gate 126 and/or 127 is allowed or inhibited so as to control character pattern data to be added or not in the video picture signal adding circuits in the next stage.

Video signal adding circuits 128 and 129 add character pattern data delivered from respective AND-gates 126 and 127 to the video picture signal supplied from picture pickup circuit 5 so as to superimpose character patterns on the video picture signal. The video picture signals overlaid with character patterns in video picture signal adding circuits 128 and 129 are sent out to VTR portion 8 and monitor screen driver circuit 7, respectively.

Next, the operation of the thus constructed superimposition controlling circuit will be described.

Microcomputer 210 for controlling the entire video camera performs edit-control of the text to be superimposed on both the video picture signal displayed on monitor screen 6 and the video picture signal recorded on the video tape (not shown).

Composition of the text is effected on text memory 110 of 12-row×24 column matrix. That is, microcomputer 210 designates positions of memory sections on text memory 110 so as to write characters one by one onto the text memory.

An instruction of writing onto text memory 110 is effected by a control command containing a four-bit row address and a five-bit column address and the data associated with the control command. The control command and the associated data therewith are serially transmitted from microcomputer 210 to superimposition controlling circuit 209 and accepted therein by a pair of shift-registers combined, namely command register 101 and data register 102.

Command decoder 303 decodes the command accepted by command register 101 and if the command indicates the data to be written in, the row and column designated by the command is selected by row-address selector 113 and column-address selector 114 so that a writing pulse is generated for text memory 110.

When the writing pulse is launched from command decoder 303, the data held in data register 102 is written onto text memory 110.

The data to be written onto text memory 110 comprises a character code and modifying information associated therewith. The character code may be constructed of one-byte or two-byte character code system selected depending upon the text content to be displayed. Examples of one-byte character code for representing alphanumeric include ISO code and ANSI code, etc. On the other hand, inclusion of Japanese characters such as 'kana' and 'kanji' (Japanese phonogram and Chinese characters, respectively) requires a two-byte character code containing the JIS first-level kanji and the JIS one-byte code.

Associated information with character code is composed of one bit allotted for designating the monitor screen as an output means, another bit allotted for designating the VTR portion as another output means, a field for designating a color to be displayed. The two bits for designating output means enable the monitor screen and/or the VTR portion to be designated independently of one another.

Character information to be outputted to the VTR portion is typically a date indication while character information to be outputted on the monitor screen includes: in addition to the date indication, operation indication which is displayed for a period of time in accordance with the operation of a video camera switch as the switch is operated; and cautions relating to the operation State of the video camera such as a remaining amount of tape and a remaining amount of battery power, etc.

Next, FIG.3 is a diagram showing an example Of texts to be stored in the aforementioned text memory 110.

Text memory 110 is a readable and writable memory for storing display data for one full-frame of the screen consisting of, as shown in FIG.3, in total, 288 (12 rows×24 columns) character sections for display character data.

Each display character data consists of, as described above, a character code and associated information with character. The associated information with character includes a field for designating a display color, which consists of three bits and indicates red by [100], green by [010], blue by [001] and white by [111]. This color information is outputted commonly to the two output means.

Detail of controlling the character display color is not the subject matter of the present invention and is considered to be unnecessary so that no further description will be made.

In accordance with the character display example shown in FIG.3, display character data stored at an address (row '0', column '0') in text memory 110 indicates that the character is "1", the output means is "monitor screen and VTR portion", and the display color is "white". Display character data held at another address (row '8', column '1') designates that the character is "B", the output means is "monitor screen", and the display color is "red". Display character data held at still another address (row '10', column '18') designates that the character is "F", the output means is "monitor screen", and the display color is "green".

Here, addresses with no display character data held are stored with blank data.

The procedure of address counting in text memory 110 is performed such that the column address is successively increased one by one from column '0' to column '23' in synchronization with the scanning of the video picture signal in horizontal direction. Then, every time the horizontal synchronization signals are counted 'm' times, the row address is successively increased one by one, counting up from row '0' to row '11' within a span of one field.

Next, FIGS.4 to 6 show relations between positions of a prior art video camera and display states of its monitor screen in the normal picture taking use and in the self-image taking use.

FIG.4 shows a manner in which a video image of an object A is displayed on monitor screen 6 when the normal picture taking operation is effected.

The video camera shown in FIG.4 is composed of a camera portion 1 accommodating a camera lens 4 and a picture pickup circuit 5; a monitor portion 2 accommodating a liquid crystal display monitor screen 6, a VTR portion 8 and operation switches 18; and a joint portion 3 which allows camera portion 1 to rotate relative to monitor portion 2.

Here, it will be assumed that displayed simultaneously on monitor screen 6 shown in FIG.4 are a date indication (e.g., 1993.4.1) 19 to be recorded on a video tape, a caution indication (e.g., BATTERY) 20 which indicates the battery power of the video camera runs short and an operation indication (e.g., FOCUS) 21 which indicates an operation type of operation switches 18.

At the time of the normal picture-taking operation, monitor screen 6 is scanned from the upper left to the lower right, or in the same direction as is done on a typical TV screen.

FIG.5 is a self-image picture-taking state of the video camera in which both camera lens 4 and monitor screen 6 are oriented toward an identical objects B. For effecting the self-image taking, with camera portion 1 fixed, monitor portion 2 is rotated upside down or 180 degrees on joint portion 3 so that monitor screen 6 may be oriented in the same direction with the picture-taking direction of camera lens 4 (hereinafter, this state is called self-image picture-taking state I).

In the self-image picture-taking state I, monitor screen 6 is scanned with the scanning direction turned right-side left in opposition to the case of the normal picture taking, from the upper right to the lower left. As a result, the picture of an object B is displayed on monitor screen 6, right-side left or as a horizontally inverted mirror-image.

FIG.6 shows another self-image picture-taking state. For effecting the self-image taking, with monitor portion 2 fixed, camera portion 1 is rotated upside down or 180 degrees on joint portion 3 so that monitor screen 6 may be oriented in the same direction with the picture-taking direction of camera lens 4 (hereinafter, this state is called self-image taking state II).

In the self-image picture-taking state II, monitor screen 6 is scanned with the scanning direction turned upside down in opposition to the case of the normal picture taking, from the lower left to the upper right. As a result, the picture of an object C is displayed on monitor screen 6, right-side left or as a horizontally inverted mirror-image.

However, in the above prior art self-image picture-taking states, since the scanning direction of the monitor screen is turned right-side left or up-side down to display the mirror-image picture, if display characters are tried to be displayed on the monitor screen as is performed in the normal picture taking state, characters turned right-side left or up-side down are displayed on the monitor screen. Therefore, the text superimposition on the monitor screen in the self-image picture-taking states was inhibited. Accordingly, the prior art apparatus suffered from a problem that the date and/or time to be recorded on the video tape could not be confirmed on the monitor screen.

In addition, in the self-image picture-taking state I, since monitor portion 2 is turned down-side up as compared to the normal taking state, the operation switches are positioned on the top of the monitor screen, if the operation indication is tried to be displayed on the monitor screen as is performed in the normal picture taking state, the indication on the monitor screen is displayed away from the position of the operation switches and the display character is turned right-side left on the monitor screen. Therefore, the operation indication on the monitor screen in the self-image picture-taking state was inhibited. Accordingly, the prior art apparatus suffered from inconvenience that the operation of the video camera could not be confirmed on the monitor screen.

SUMMARY OF THE INVENTION

In view of the above problems of the prior art video camera, the present invention is to allow proper character display on the monitor screen without characters horizontally or vertically inverted.

It is therefore an object of the present invention to provide a monitor screen-integrated video camera (to be referred to as a video camera hereinafter) which includes a camera portion having a camera lens for picking up a picture of objects, a monitor portion having a monitor screen such as of LCD (liquid crystal display), etc., for displaying a video picture taken by the camera portion or a video picture reproduced from a video tape and a joint structure for rotatably jointing the camera portion with the monitor portion, and which can be used both for normal picture taking in which the lens face of the camera lens is opposed to the face of the monitor screen and for self-image picture taking in which the lens face of the camera lens and the face of the monitor screen are oriented in the same direction.

Further, it is another object of the present invention to provide a video camera having the above configuration, which has a function allowing the scanning direction on the monitor screen to be inverted in order to horizontally invert the video picture that is taken by the camera portion in the self-image picture taking state to thereby display a mirror-image of the taken picture on the monitor screen. (Here, this function will be refereed to as a mirror-image display function.)

In order to achieve the above object, the present invention provides a superimposition controlling circuit which generally allows character display such as a date, operation indication and caution indication relating to the operation state of the video camera to be displayed on the monitor screen of the video camera and which generally allows character display such as a date, time and the like to be recorded on a video tape, and which, when the monitor screen is scanned in an opposite direction because of the aforementioned mirror-image display function, makes it possible to display properly readable character patterns on the monitor screen by horizontally or vertically inverting the text display signals of the characters to be superimposed on the monitor screen.

Moreover, the present invention is to superimpose inverted character pattern signals on the monitor signals of a video picture to be displayed on the monitor screen, and at the same time, to superimpose non-inverted character pattern signals onto the recording signals of the video picture to be recorded on a video tape.

To achieve the above objects the present invention is constructed as follows.

That is, in accordance with a first aspect of the present invention, a monitor screen-integrated video camera comprises: a camera portion having a camera lens for picking up a picture of objects; a monitor portion having a monitor screen that displays the picture taken by the camera portion; a joint portion for jointing the camera portion with the monitor portion in a relatively rotatable manner; a monitor driver circuit which, when both the camera lens and the monitor screen are oriented toward an identical object, allows the monitor screen to display an horizontally inverted mirror-image of the picture taken by the camera portion; a character code generating means for generating character codes for texts to be superimposed over the monitor screen; a character generator for generating character patterns in association with character codes supplied from the character code generating means; an inverting circuit for horizontally inverting a character pattern output generated from the character generator; and an editing means for horizontally replacing the order of arrayed characters constituting each row to be displayed on the monitor screen.

In accordance with a second aspect of the present invention, a monitor screen-integrated video camera comprises: a camera portion having a camera lens for picking up a picture of objects; a monitor portion having a monitor screen that displays the picture taken by the camera portion; a joint portion for jointing the camera portion with the monitor portion in a relatively rotatable manner; a monitor driver circuit which, when both the camera lens and the monitor screen are oriented toward an identical object, allows the monitor screen to display an horizontally inverted mirror-image of the picture taken by the camera portion; a character code generating means for generating character codes for texts' to be superimposed over the monitor screen; and a character generator for generating character patterns in association with character codes supplied from the character code generating means, wherein the character generator provides a first character generator output which can be horizontally inverted and can be superimposed over the video picture signal to be outputted to the monitor screen and a second character generator output which can be superimposed over the video picture signal to be recorded on a video tape.

In accordance with a third aspect of the present invention, a monitor screen-integrated video camera comprises: a camera portion having a camera lens for picking up a picture of objects; a monitor portion having a monitor screen that displays the picture taken by the camera portion; a joint portion for jointing the camera portion with the monitor portion in a relatively rotatable manner; a monitor driver circuit which, when both the camera lens and the monitor screen are oriented toward an identical object, allows the monitor screen to display an horizontally inverted mirror-image of the picture taken by the camera portion; and a superimposition controlling circuit which is able to switch the mode of characters to be outputted to the monitor screen between a horizontally inverted character output mode and a non-inverted character output mode and which, as the modes are changed over, allows the display positions of characters to be modified.

In accordance with a fourth aspect of the present invention, a monitor screen-integrated video camera comprises: a camera portion having a camera lens for picking up a picture of objects; a monitor portion having a monitor screen that displays the picture taken by the camera portion; a joint portion for jointing the camera portion with the monitor portion in a relatively rotatable manner; a monitor driver circuit which, when both the camera lens and the monitor screen are oriented toward an identical object, allows the monitor screen to display an horizontally inverted mirror-image of the picture taken by the camera portion; a character code generating means for generating character codes for texts to be superimposed over the monitor screen; a character generator for generating character patterns in association with character codes supplied from the character code generating means; and an inverting circuit for vertically inverting a character pattern output generated from the character generator.

In accordance with a fifth aspect of the present invention, a monitor screen-integrated video camera comprises: a camera portion having a camera lens for picking up a picture of objects; a monitor portion having a monitor screen that displays the picture taken by the camera portion; a joint portion for jointing the camera portion with the monitor portion in a relatively rotatable manner; a monitor driver circuit which, when both the camera lens and the monitor screen are oriented toward an identical object, allows the monitor screen to display an horizontally inverted mirror-image of the picture taken by the camera portion; a character code generating means for generating character codes for texts to be superimposed over the monitor screen; and a character generator for generating character patterns in association with character codes supplied from the character code generating means, wherein the character generator provides a first character generator output which can be vertically inverted and can be superimposed over the video picture signal to be outputted to the monitor screen and a second character generator output which can be superimposed over the video picture signal to be recorded on a video tape.

In accordance with a sixth aspect of the present invention, a monitor screen-integrated video camera comprises: a camera portion having a camera lens for picking up a picture of objects; a monitor portion having a monitor screen that displays the picture taken by the camera portion; a joint portion for jointing the camera portion with the monitor portion in a relatively rotatable manner; a monitor driver circuit which, when both the camera lens and the monitor screen are oriented toward an identical object, allows the monitor screen to display an horizontally inverted mirror-image of the picture taken by the camera portion; and a superimposition controlling circuit which is able to switch the mode of characters to be outputted to the monitor screen between a vertically inverted character output mode and a non-inverted character output mode and which, as the modes are changed over, allows the display positions of characters to be modified.

With the above configurations, the present invention allows, when the video camera is used for self-image picture taking mode in which a picture of objects is displayed on the monitor screen as a mirror-image by inverting the scanning direction on the monitor screen, display characters that is to be superimposed onto the picture on the monitor screen, to be properly displayed on the monitor screen by horizontally or vertically inverting the characters to be superimposed. And at the same time, display characters such as a date, time, etc., to be superimposed onto the video picture signal that is recorded on a video tape is, without being inverted, outputted separately to be recorded.

DESCRIPTION OF THE PREFERRED EMBODIMENTS

One embodiment of the present invention will hereinafter be described with reference to the accompanying drawings.

Figure 1:
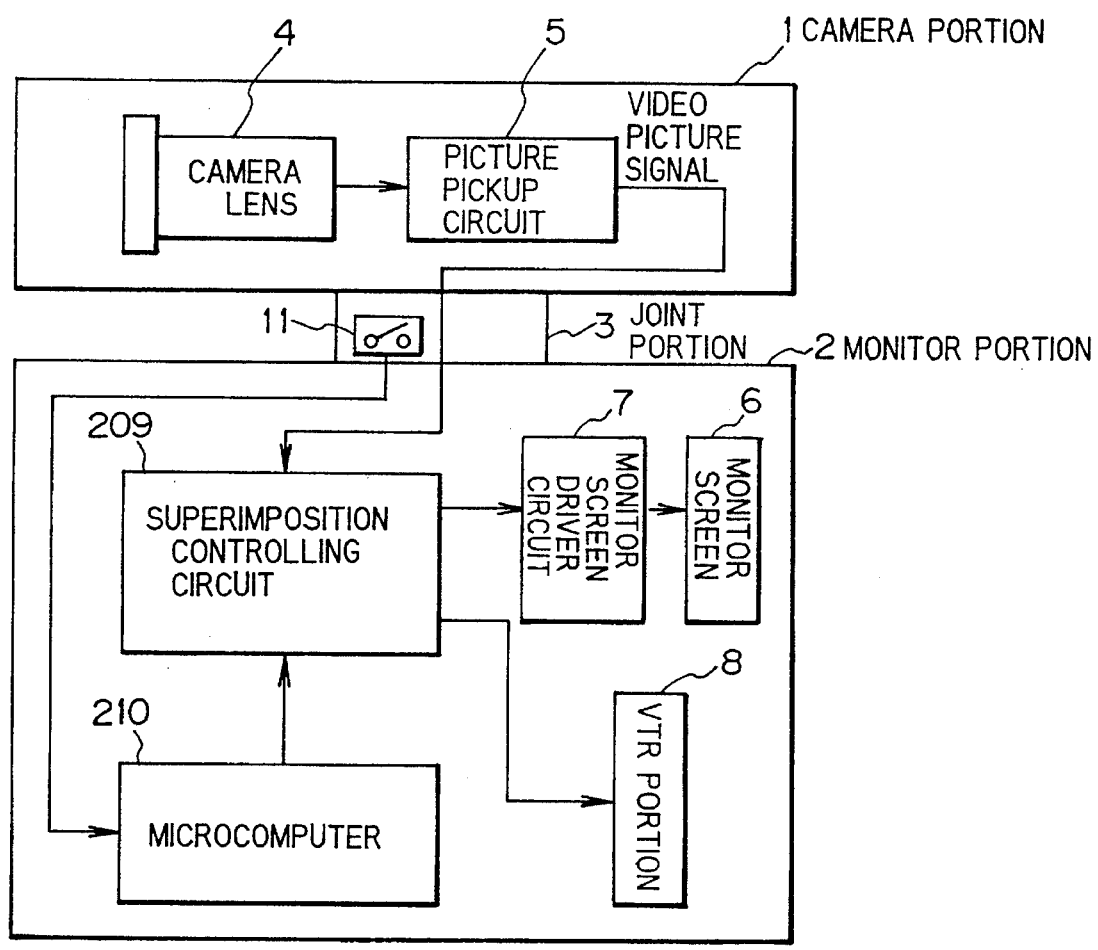
FIG.1 is an overall block diagram of a prior art example of a monitor screen-integrated video camera.
Figure 2:
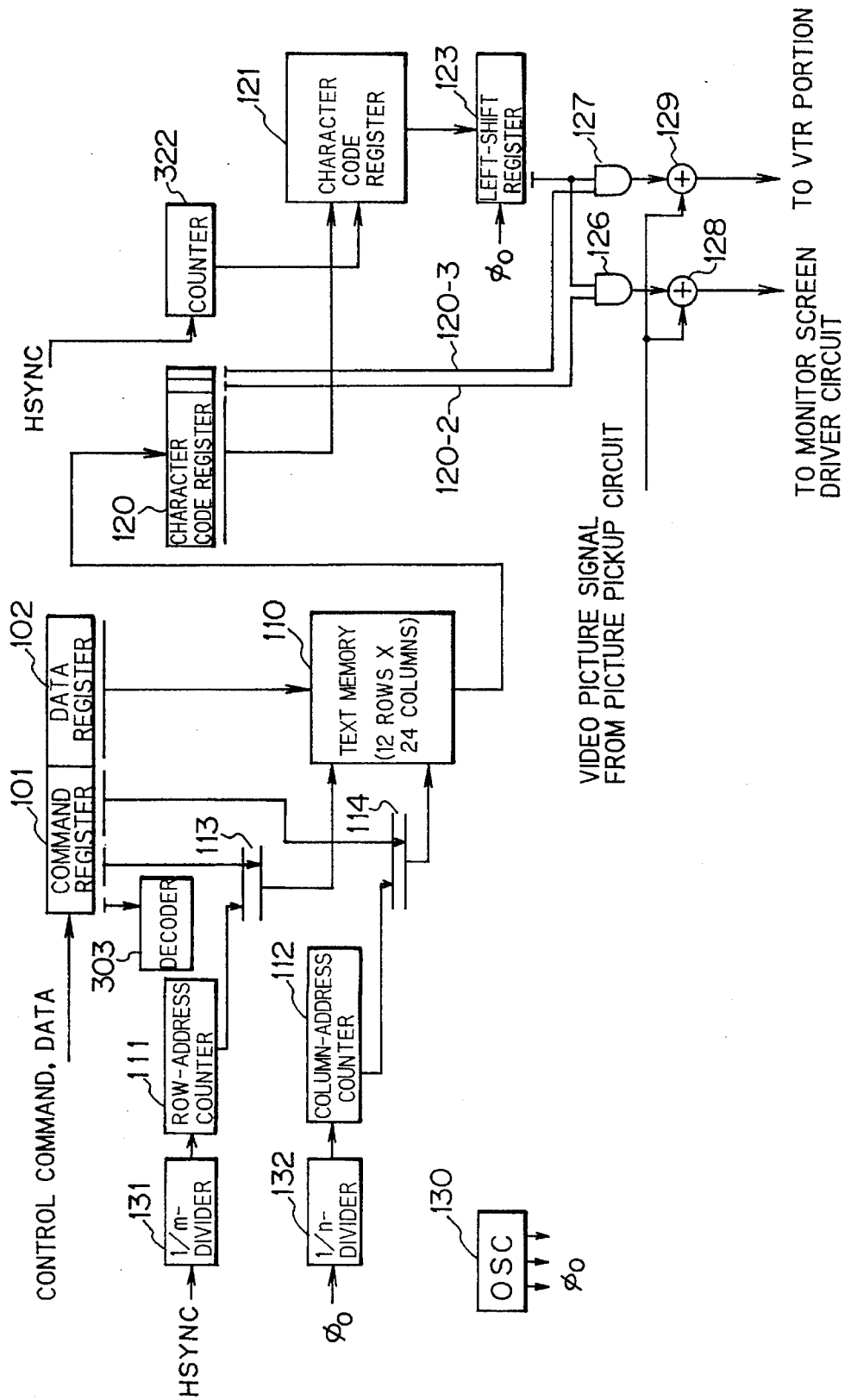
FIG.2 is a block diagram showing a prior art example of a superimposition controlling circuit in a monitor screen-integrated video camera.
Figure 3:
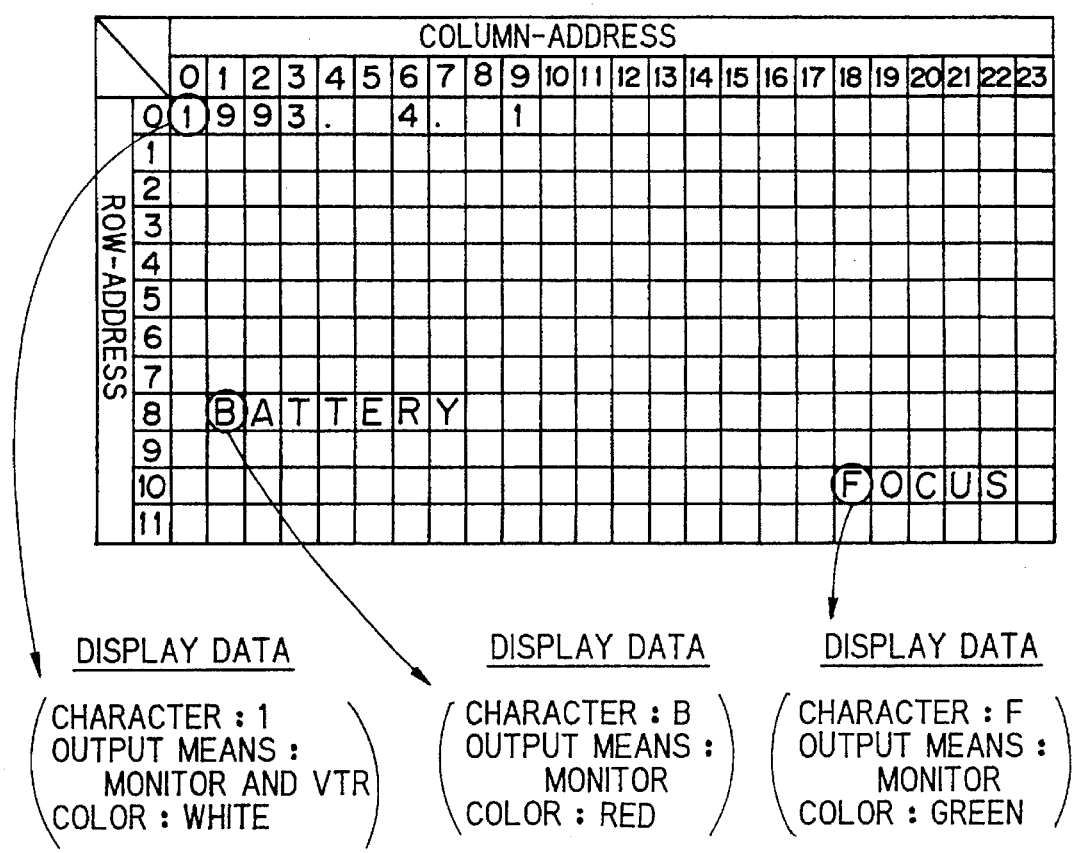
FIG.3 is a chart of an address arrangement showing a prior art example of a storage state of data in a text memory.
Figure 4:
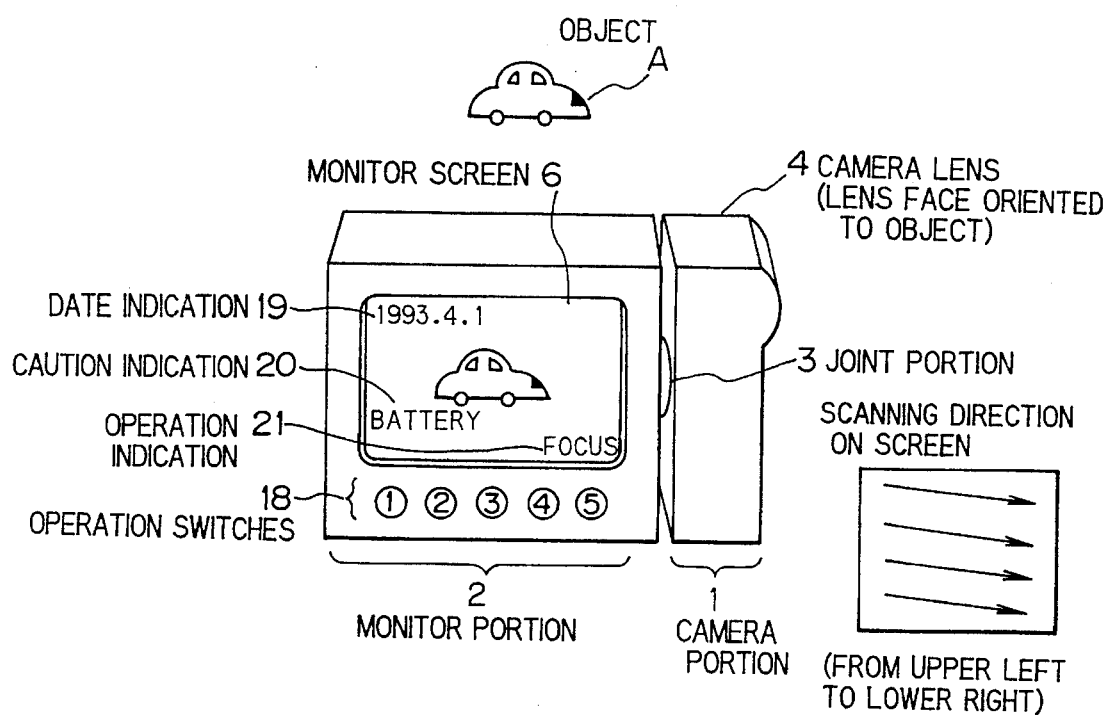
FIG.4 is a view showing a prior art display example on a monitor screen in the normal picture-taking state.
Figure 5:
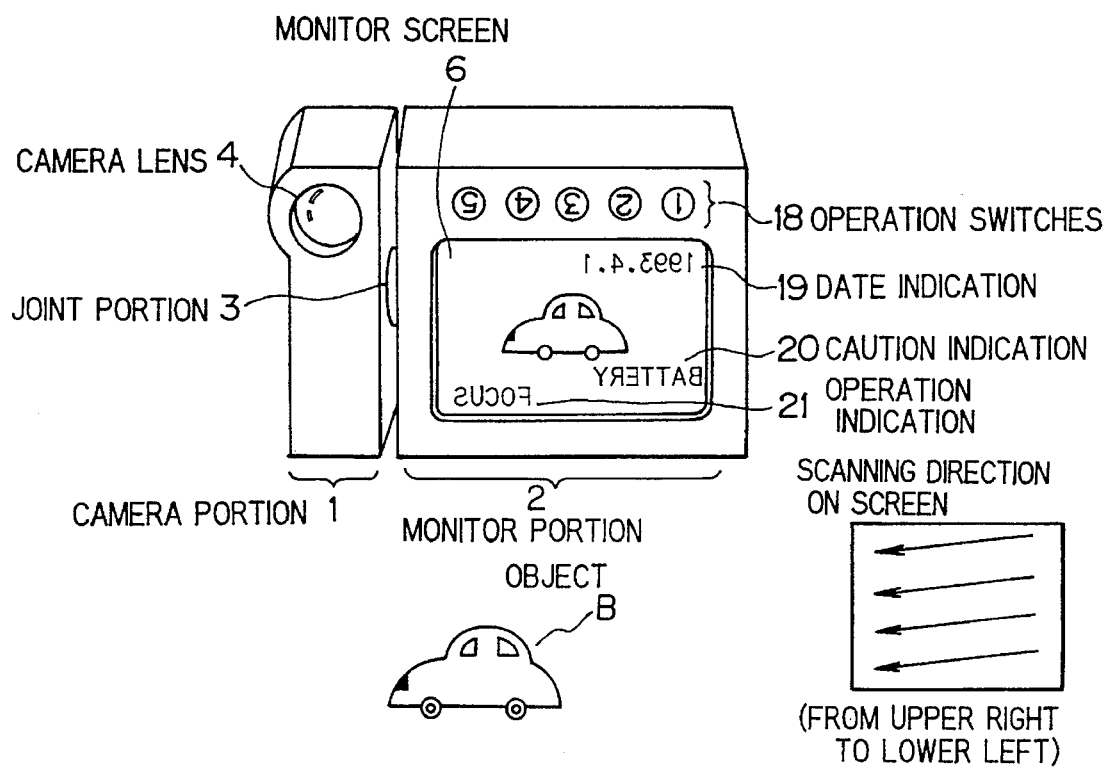
FIG.5 is a view showing a prior art display example on a monitor screen in the self-image picture-taking state I.
Figure 6:
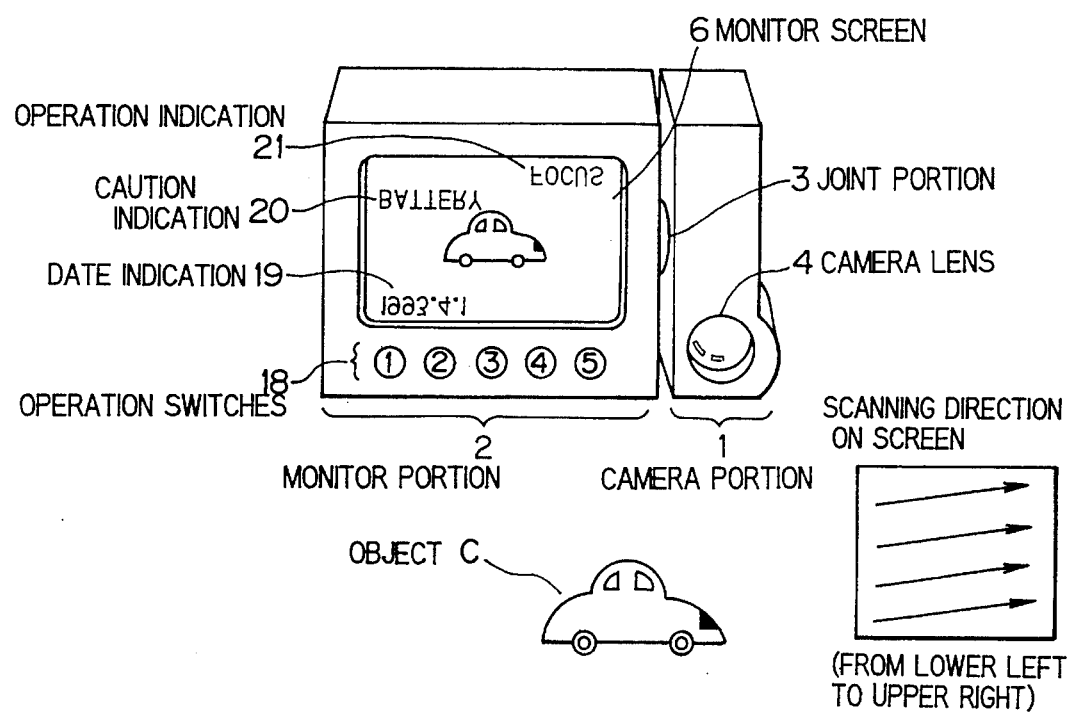
FIG.6 is a view showing a prior art display example on a monitor screen in the self-image picture-taking state II.
Figure 7:
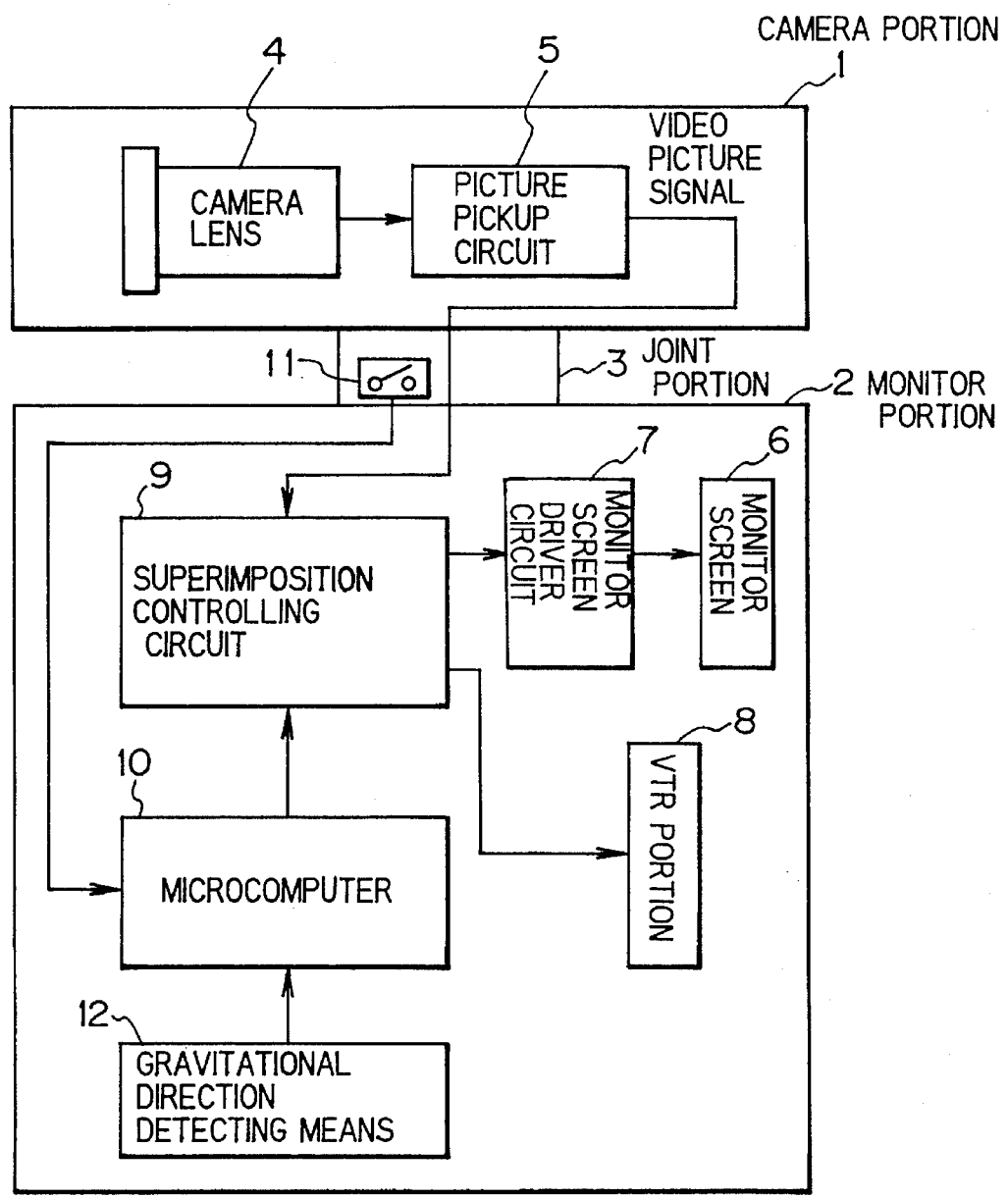
FIG.7 is an overall block diagram of an embodiment of a monitor screen-integrated video camera in accordance with the present invention.

FIG.7 is an overall block diagram showing an embodiment of a monitor screen-integrated video camera in accordance with the present invention. In the figure, components corresponding to those in the prior art example shown in FIG.1 are allotted with the same reference numerals.

In FIG.7, the video camera of the present invention has a camera portion 1 for picking up a picture of objects, a monitor portion 2 for displaying the picture of the objects that have been taken, and a joint portion 3 for jointing camera portion 1 and monitor portion 2 and allowing relative rotation of one to another.

Camera portion 1 includes a camera lens 4, a picture pickup circuit 5 which converts optical images of objects formed by camera lens 4 into video picture signals to be outputted to monitor portion 2, and an unillustrated camera lens control system.

Monitor portion 2 includes: a monitor screen 6 such as of a liquid crystal panel or the like for displaying a picture of objects taken; a display driver circuit 7 for driving monitor screen 6; a VTR portion 8 for recording video picture signals on an unillustrated video cassette tape and reproducing video picture signals from a video cassette tape; a superimposition controlling circuit 9 for superimposing a date over the video picture to be outputted to VTR portion 8 and for superimposing various kinds of displays which can be horizontally or vertically inverted over the video picture on monitor screen 6; a microcomputer 10 for controlling the entire video camera; and a gravitational direction detecting means 12 for detection of a position (normal, self-image states I, II, etc.) of the video camera.

Joint portion 3 has a rotational angle detecting switch 11 that detects a relative rotational angle of camera portion 1 to monitor portion 2. The rotational angle detecting switch 11 outputs to microcomputer 10 a self-image picture-taking mode signal that indicates that the camera is set in a position for picking up self-image when both camera lens 4 and monitor screen 6 are oriented to the same object.

Microcomputer 10 distinguishes with reference to the self-image picture-taking mode signal whether camera is set in the normal pickup position or in one of self-image taking positions, and if the camera is decided to be set in a self-image taking position, microcomputer 10 effects a further judgment of which position the camera is set in, self-image picture-taking state I or self-image picture-taking state II (to be described in detail hereinafter) based on a camera-position signal delivered from gravitational direction detecting means 12. Microcomputer 10, having recognized that the camera is set in self-image; picture-taking state I or II, may send out an instruction to display driver circuit 7 that video picture being taken is inverted horizontally as a mirror-image to be displayed on monitor screen 6.

Figure 8:
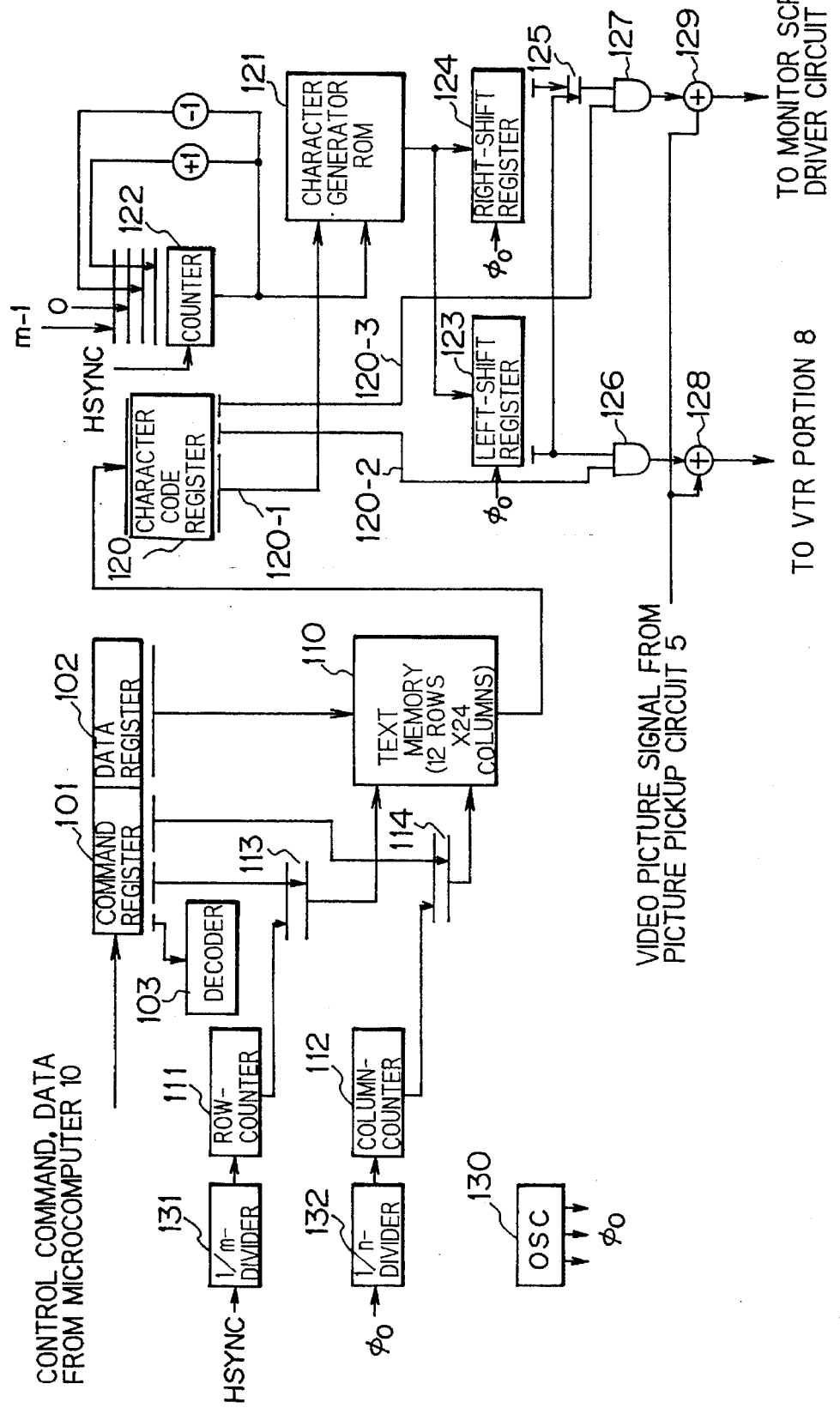
FIG.8 is a block diagram showing a superimposition controlling circuit in an embodiment of a monitor screen-integrated video camera in accordance with the present invention.

Next, FIG.8 is a block diagram showing a superimposition controlling circuit 9 as a part of monitor portion 2.

Superimpose controlling circuit 9 comprises a command register 101, a data register 102, a command decoder 103, a text memory 110, a row-counter 111, a column-counter 112, a row-address selector 113, a column-address selector 114, a character code register 120, a character generator ROM 121, a ROM address counter 122, a left-shift register 123, a right-shift register 124, a right-side-left inversion switching selector 125, AND-gates 126, 127, video picture signal adding circuits 128, 129, a clock oscillator (OSC) 130, a 1/m-divider 131 and a 1/n-divider 132.

Next, each component of the superimposition controlling circuit will be now described in detail.

Command register 101 and data register 102 are each composed of a series input/parallel output shift register and receive command and display character data associated with the command, respectively, both of which are serially transmitted from microcomputer 10, and output parallel command and data, respectively.

Command decoder 103 decodes the command accepted by command register 101 and generates a control mode signal and a control timing signal.

Text memory 110 consists of memory sections arranged in a 12-row×24-column matrix form for filling one full-frame region of the screen. Each of the memory sections can store a character code for one character and information associated with the character. Information to be written in text memory 110 is display character data consisting of character codes and associated information with characters held in data resister 102, and is written in memory sections designated by corresponding commands.

An address in text memory 110 is designated by a two-way selector, that is, consisting of a row-address selector 113 and a column-address selector 114. Upon writing data into text memory 110, selectors 113 and 114 are designated by a writing address associated with the data to be written in and stored in the command register, to thereby form a text memory address. When data in text memory 110 is to be read out, an address in the text memory is generated by selecting row and column addresses with the help of a row-counter 111 and a column-counter 112 that count cyclically.

Column-counter 112 for providing a column-address (or a horizontal-direction address) in text memory 110 is a 24-base number counter composed of an updown counter and is initialized by a horizontal synchronizing signal (HSYNC) and counts signals $\phi_1$, cyclically in ascending order, which are formed by dividing an output signal $\phi_0$ from clock oscillator (OSC) 130 by means of 1/n-divider circuit 132. Here, a period of $\phi_0$ is a time corresponding to a horizontal length of one pixel in forming character patterns that are read out from the character generator ROM and 'n' is a number in the horizontal direction of the pixels constituting one character.

Row-counter 111 for providing a row-address (or a vertical-direction address) in text memory 110 is a 12-base number counter composed of a updown counter and is initialized by a vertical synchronizing signal (VSYNC) and counts signals, cyclically in ascending order, that are formed by dividing the horizontal synchronizing signal (HSYNC) by means of 1/m-divider circuit 131. Here, 'm' is a number in the vertical direction of the pixels constituting one character.

Character code register 120 stores the character codes and associated modifying information therewith which are read out from text memory 110.

Character generator ROM 121 converts a character code into a display pattern of m dots (in vertical direction)×n dots (in horizontal direction). In the present embodiment, m=18 and n=12 as will be shown later in FIGS.15A and 15B.

A readout address in character generator ROM 121 consists of an upper bit portion indicating a character code in character code register 120 and a lower bit portion which is provided from ROM address counter 122 so as to read out in parallel n-bit pattern data corresponding to n dots in the horizontal direction.

ROM address counter 122 is composed of an updown counter in which an initial value can be preset as 0 or m−1, and counts horizontal synchronizing signals in ascending or descending order. A counting value by ROM address counter 122 provides a lower bit portion for the readout address in character generator ROM 121 and the thus formed addresses are used to successively read out n-dot row data by 'm' times in vertical direction to form one character pattern.

When character patterns stored in character generator ROM 121 are to be read out With being inverted upside down, the initial value of ROM address counter 122 is set as m−1, and the counter effects counting in down-counting mode or decreases its counting value one by one every time the horizontal synchronization signal is detected.

Left-shift register 123 and right-shift register 124 are readout registers for character generator ROM 121. After n-bit read-out data sets have been set in parallel in the register, the data sets are shifted based on clock signal $\phi_0$ to be converted into serial data.

Left-shift register 123 reads out character patterns corresponding to one line in parallel with one another from character generator ROM 121 and successively converts the data from the left end into serial data to supply normal character patterns without being horizontally inverted.

Right-shift register 124 reads out character patterns corresponding to one line in parallel with one another from character generator ROM 121 and successively converts the data from the right end into serial data to supply horizontally inverted character patterns to be superimposed over the mirror-image picture in the self-image picture-taking state.

Inversion switching selector 125 is a two-way selector which may change over its mode with reference to the indication from command decoder 103 so as to select one pattern mode from the normal character pattern mode in which data is delivered from left-register 123 and the horizontally inverted character pattern mode in which data is delivered from right-register 124.

The character pattern data delivered serially from left-shift register 123 is supplied to one terminal of an AND-gate 126. On the other hand, the character pattern data delivered serially from inversion switching selector 125 is supplied to one terminal of another AND-gate 127. Output indicating bits 120-2, 120-3 for the modifying information in character code register 120 are connected to respective other input terminals of AND-gates 126 and 127. In accordance with ON/OFF state in output indicating bits 120-2 and 120-3, the output from AND-gate 126 and/or 127 is allowed or inhibited so as to control character pattern data to be added or not in the video picture signal adding circuits in the next stage.

Video signal adding circuits 128 and 129 add character pattern data delivered from AND-gate 126 or inversion switching selector 125 to the video picture signal supplied from picture pickup circuit 5 so as to superimpose character patterns on the video picture signal. The video picture signals overlaid with character patterns in video picture signal adding circuits 128 and 129 are sent out to VTR portion 8 and monitor screen driver circuit 7, respectively.

Next, common operation to all the picture taking states of the thus constructed superimposition controlling circuit will be described.

Microcomputer 10 for controlling the entire video camera performs edit-control of the text to be superimposed on both the video picture signal displayed on monitor screen 6 and the video picture signal recorded on the video tape (not shown).

Composition of the text is effected on text memory 110 of 12-row×24-column matrix corresponding to one full-frame of the screen. That is, microcomputer 10 designates positions of memory sections on text memory 110 so as to write characters one by one onto the text memory, whereby display texts for one full-frame of the screen are formed.

An instruction of writing onto text memory 110 is effected by a control command containing a four-bit row address and a five-bit column address and the data associated with the control command. The control command and the associated data therewith are serially transmitted from microcomputer 10 to superimposition controlling circuit 9 and accepted therein by a pair of shift-registers combined, namely command register 101 and data register 102.

Command decoder 103 decodes the command accepted by command register 101 in response to an unillustrated instruction signal from microcomputer 10 and if the command indicates the data to be written in, the row and column designated by the command is selected by row-address selector 113 and column-address selector 114 so that a writing pulse is generated for text memory 110.

When the writing pulse is launched from command decoder 103, the data held in data register 102 is written onto text memory 110.

The data to be written onto text memory 110 comprises a character code and modifying information associated therewith. The character code may be selected from appropriate character code systems depending upon the text content to be displayed. Alternatively, if the kinds of characters to be used are limited, it is possible to define and use a unique code system. In the embodiment of the present invention, JIS code is used as the character code.

Associated information with character code is composed of one bit allotted for designating the monitor screen as an output means, another bit allotted for designating the VTR portion as another output means, a field for designating a color to be displayed. The two bits for designating output means enable the monitor screen and/or the VTR portion to be designated independently of one another. The field for designating a display color consists of three bits, indicating red by [100], green by [010], blue by [001] and white by [111]. This color information is outputted commonly to both the output means, VTR portion 8 and monitor screen driver circuit 7.

Character information to be outputted to the VTR portion is typically a date indication to be displayed with white while character information to be outputted on the monitor screen includes: in addition to the date indication, operation indication (with green indication) which is displayed for a period of time in accordance with the operation of a video camera switch as the switch is operated; and cautions (with red indication) relating to the operation state of the video camera such as a remaining amount of tape and a remaining amount of battery power, etc.

Figure 9:
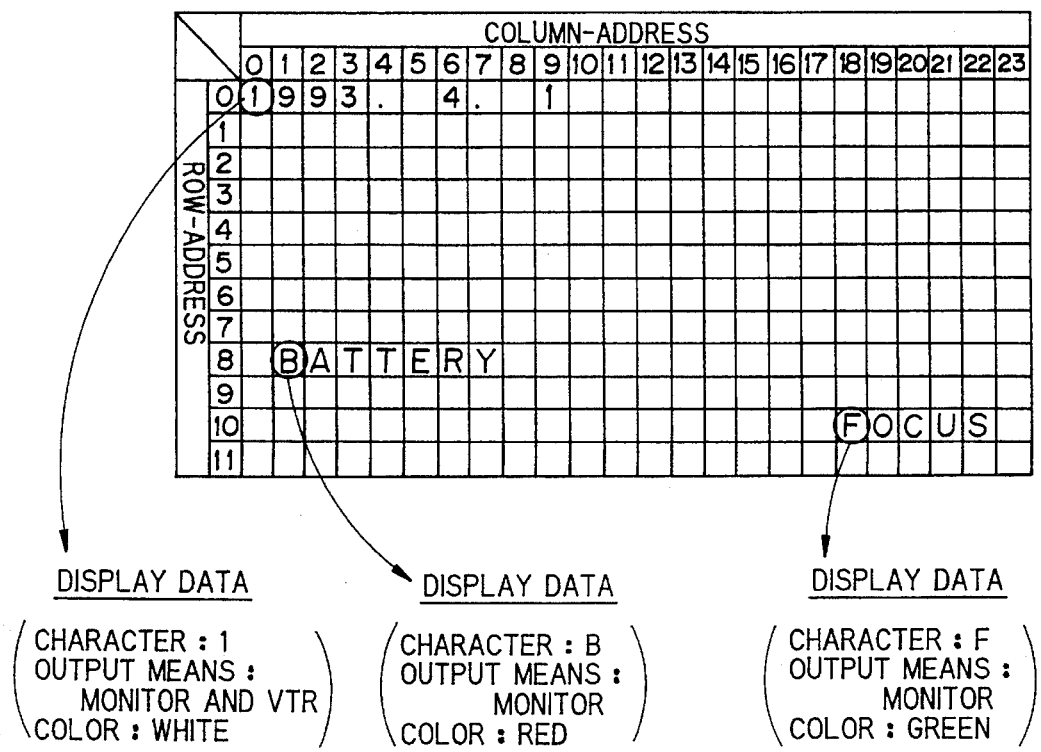
FIG.9 is a chart of an address arrangement showing an example of a storage state of data in a text memory in the normal picture taking state in accordance with an embodiment of the present invention.
Figure 10:
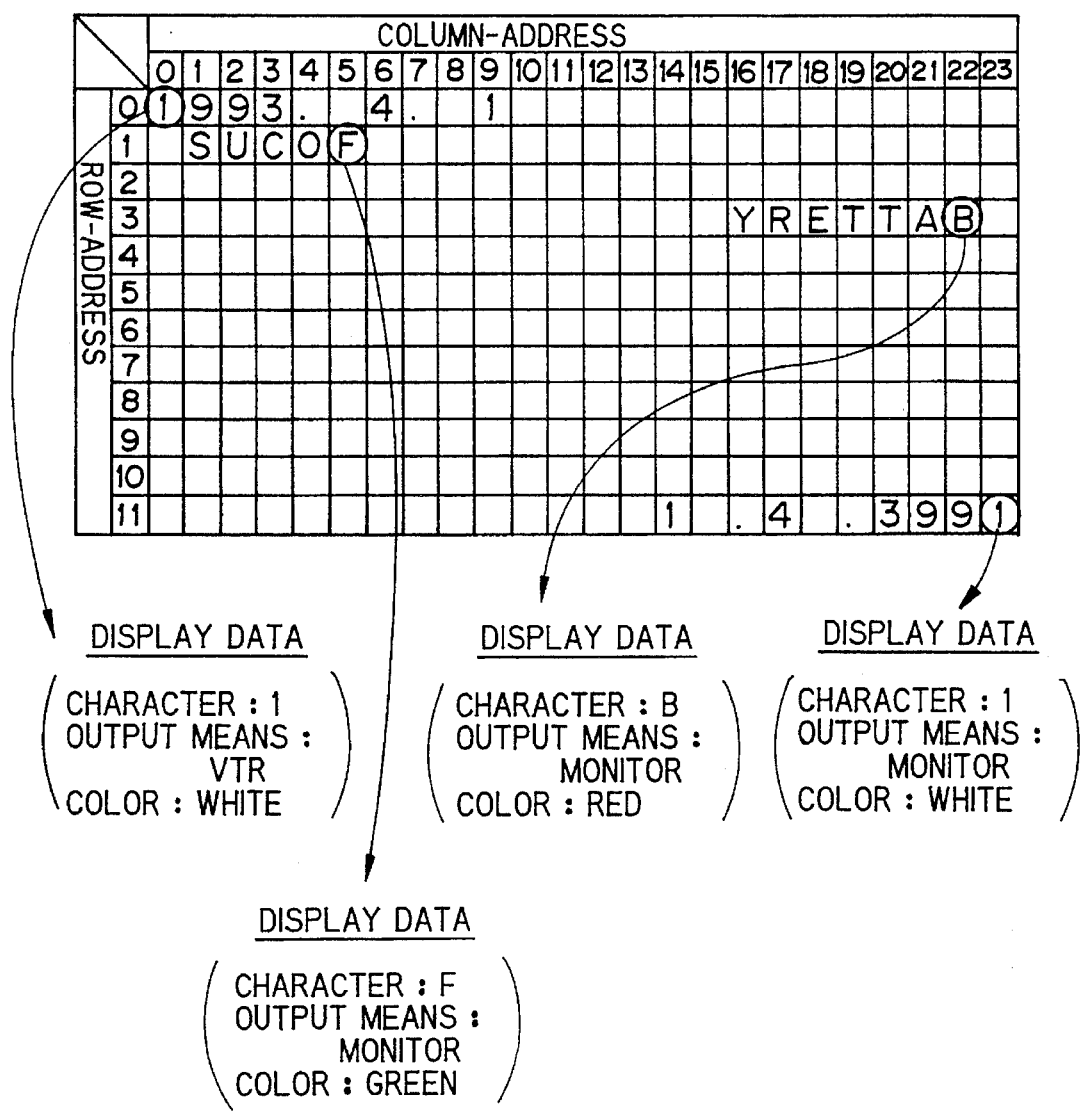
FIG.10 is a chart of an address arrangement showing an example of a storage state of data in a text memory in the self-image picture-taking state I in accordance with an embodiment of the present invention.
Figure 11:
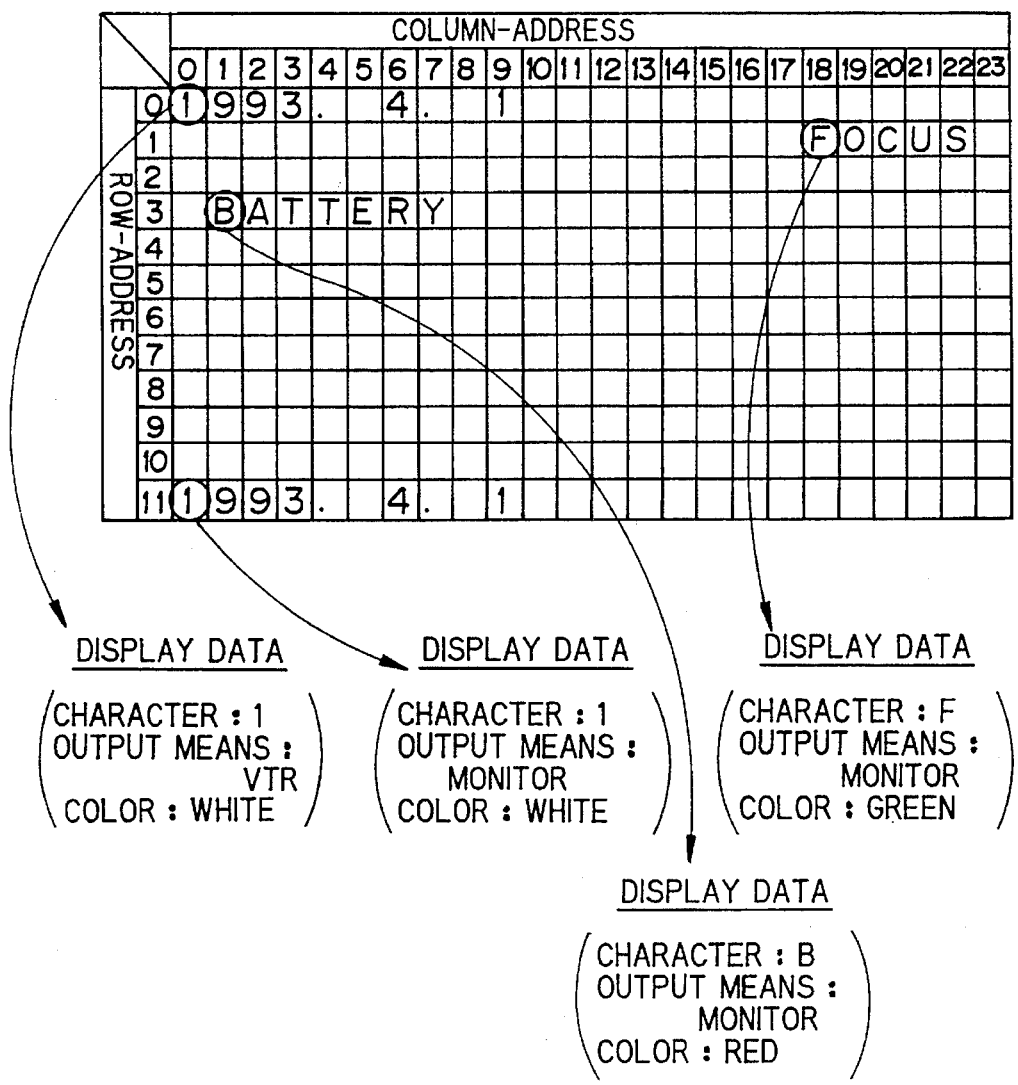
FIG.11 is a chart of an address arrangement showing an example of a storage state of data in a text memory in the self-image picture-taking state II in accordance with an embodiment of the present invention.

FIGS.9 to 11 are diagrams for illustrating text examples to be stored in the aforementioned text memory 110 in different picture-taking states and for explaining the count sequence of rows and columns in the text memory.

FIG.9 shows a storing example in text memory 110 when the normal picture-taking is effected. FIG.10 shows a storing example in text memory 110 when the camera is set up in the self-image picture taking state I. FIG.11 shows a storing example in text memory 110 when the camera is set up in the self-image picture taking state II.

As has been stated previously, text memory 110 is a readable and writable memory for storing display data for one full-frame of the screen consisting of, in total, 288 (12 rows×24 columns) character sections for display character data. Display character data for each character is composed of, as stated above, a character code and the associated information therewith.

In accordance with the character display example shown in FIG.9, display character data stored at an address (row '0', column '0') in text memory 110 indicates that the character is "1", the output means is "monitor screen and VTR portion", and the display color is "white". Display character data held at another address (row '8', column '1') designates that the character is "B", the output means is "monitor screen", and the display color is "red". Display character data held at still another address (row '10', column '18') designates that the character is "F", the output means is "monitor screen", and the display color is "green".

Here, addresses with no display character data held are stored with blank data.

In operating the normal picture-taking, the procedure of address counting for superimposing the content in text memory 110 over the video picture signals is performed such that the column address is successively increased one by one from column '0' to column '23' in synchronization with the scanning of the video picture signal in horizontal direction. Then, every time the horizontal synchronization signals are counted 'm' times, the row address is successively increased one by one, counting up from row '0' to row '11' within a span of one field.

The concept of this address count sequence comprises the steps of: dividing the full-frame of the monitor screen into 12-row×24-column matrix cells; reading out character codes from respective memory sections in text memory 110, each of the memory sections corresponding to a cell of the matrix on the screen in which the position of the signals scanning the monitor screen is contained; and converting the readout character codes into character pattern data by means of character generator ROM 121.

At the normal picture-taking operation, inversion switching selector 125 outputs the serial character pattern data without being inverted horizontally from left-shift register 123 into monitor screen driver circuit 7 through AND-gate 127 and video picture signal adding circuit 129.

Figure 12:
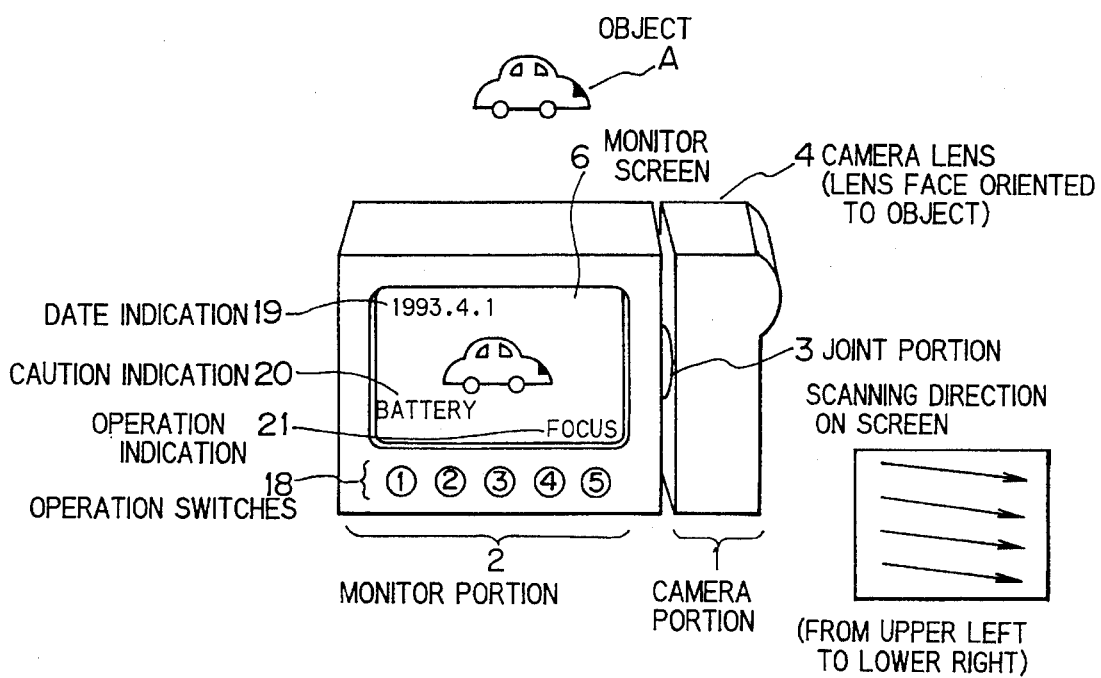
FIG.12 is a view showing a display example on a monitor screen in the normal picture-taking state in a accordance with an embodiment of the present invention.

FIG.12 shows a manner in which a video image of an object A is displayed on monitor screen 6 when the normal picture taking operation is effected. Here, it will be assumed that displayed simultaneously on monitor screen 6 are a date indication (e.g., 1993.4.1) 19 to be recorded on a video tape, a caution indication (e.g., BATTERY) 20 which indicates the battery power of the video camera runs short and an operation indication (e.g., FOCUS) 21 which indicates an operation type of operation switches 18 arranged under monitor screen 6.

At the time of the normal picture-taking operation, monitor screen 6 is scanned from the upper left to the lower right, or in the same direction as is done on a typical TV screen.

Figure 13:
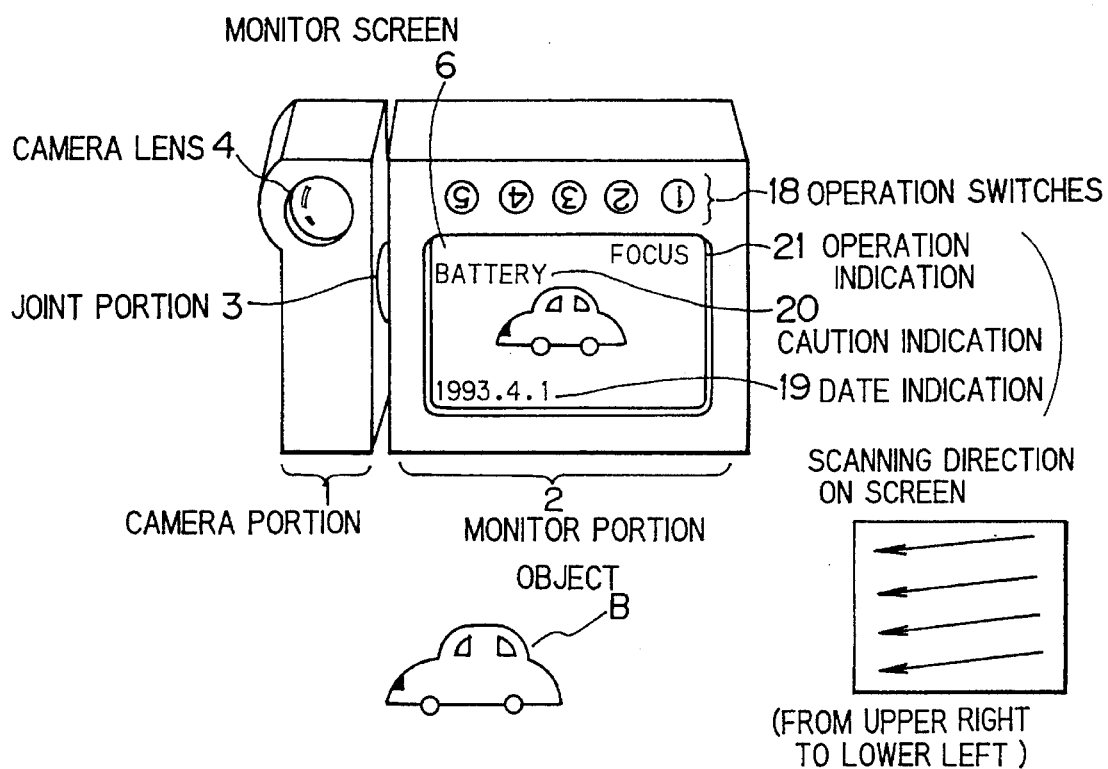
FIG.13 is a view showing a display example on a monitor screen in the self-image picture-taking state I in accordance with an embodiment of the present invention.

FIG.13 shows a self-image picture taking state I in which, with camera portion 1 upright, monitor portion 2 is rotated upside down or 180 degrees on joint portion 3 so that monitor screen 6 may be oriented in the same direction with the picture-taking direction of camera lens 4.

In the self-image picture taking state I, the video camera allows a horizontally inverted or right-side-left mirror-image picture of a pickup object B to be displayed on monitor screen 6 by scanning in a horizontally opposite direction over the screen to that in the case of FIG.12 (or from the upper right to the lower left).

Here, in the self-image picture taking state I, since monitor portion 2 is placed down-side up as shown in FIG.13, operation switches 18 locate on the top of the monitor screen. Therefore, it is convenient to position operation indication 21 close to operation switches 18, or to arrange the operation indication 21 in the upper part of monitor screen 6. For this purpose, the arrangement of each line of operation indication 21 as well as date indication 19 and caution indication 20 is vertically inverted.

FIG.10 shows display characters and the associated information therewith to be stored in text memory 110 in order to effect the monitor display in the self-image picture taking state I shown in FIG.13 mentioned above. Microcomputer 10, based on the self-image picture taking mode signal from rotational angle detecting switch 11 as well as the video camera-position signal from the gravitational direction detecting means, recognizes the self-image picture taking state I, and rewrites the content in text memory 110 in accordance with the picture-taking state so as to change the character arrangement. The order of counting addresses for text memory 110 in order to read out the display characters is the same as that effected in the normal picture taking state.

In accordance with the character display example shown in FIG.10, display character data stored at an address (row '0', column '0') in text memory 110 indicates that the character is "1", the output means is "VTR portion", and the display color is "white". Display character data held at another address (row '1', column '5') designates that the character is "F", the output means is "monitor screen" and the display color is "green". Display character data held at another address (row '3', column '22') designates that the character is "B", the output means is "monitor screen", and the display color is "red". Display character data held at still another address (row '11', column '23') designates that the character is "1", the output means is "monitor screen", and the display color is "white". In FIG.10, the text for the date is stored twice on rows '0' and '11'. The first one on the row '0' is outputted to VTR 8 without the characters being horizontally inverted while the second one on the row '11' is outputted to monitor screen driver circuit 7 with the characters being horizontally inverted. These are required because the two outputs differs in their orders of characters.

Next, the operation of superimposition controlling circuit 9 in the self-image picture taking state I will be described. Microcomputer 10 having recognized the self-image picture taking state I sends out horizontally inverting commands to superimposition controlling circuit 9 in order to horizontally invert the character patterns to be outputted to monitor screen driver circuit 7. The horizontally inverting command accepted by command register 101 is decoded by decoder 103 so that a switching signal is sent out for inversion switching selector 125. With this switching signal, inversion switching selector 125 selects one mode in which right-shift register 124 may output horizontally inverted character patterns.

Character patterns of the characters designated to be outputted on the monitor screen by the output means designating bits associated with the characters loaded by character code register 120 are processed through character generator ROM 121, horizontally inverted and serialized in right-shift register 124. The thus serialized data carrying the horizontally inverted character patterns is processed through inversion switching selector 125 and AND-gate 127 and added to the video picture signal in video picture signal adding circuit 129. The video picture signal with the horizontally inverted character patterns superimposed is inputted to monitor screen driver circuit 7 which horizontally changes the scanning direction so that the display picture may be mirror-displayed. As a result, the character patterns once horizontally inverted are re-inverted to display correct characters on monitor screen 6 without being horizontally inverted.

It should be noted that, even in the self-image picture taking state I, the characters designated to be displayed on the VTR as the output means will not inverted and read out in the same manner with that in the normal picture taking state.

Figure 14:
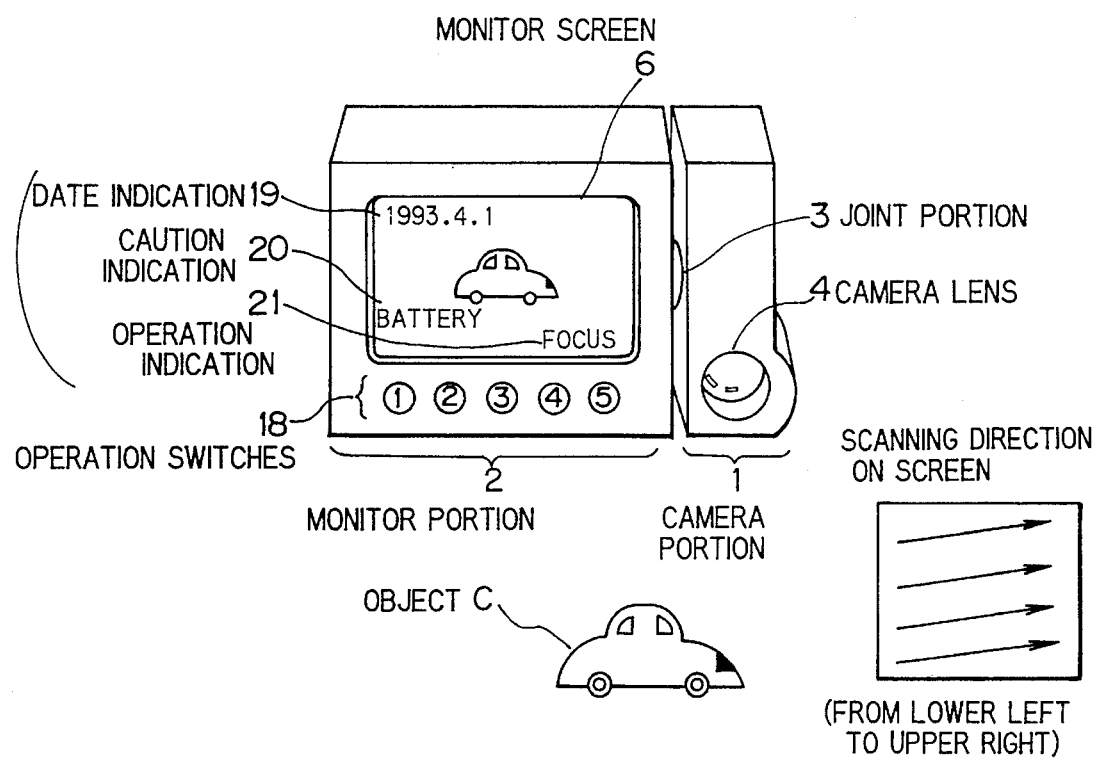
FIG.14 is a view showing a display example on a monitor screen in the self-image picture-taking state II in accordance with an embodiment of the present invention.

FIG.14 shows a self-image picture taking state II in which, with monitor portion 2 upright, camera portion 1 is rotated upside down or 180 degrees on joint portion 3 so that monitor screen 6 may be oriented in the same direction with the picture-taking direction of camera lens 4.

In the self-image picture taking state II, the video camera allows a vertically inverted or upside-down mirror-image picture of a pickup object C to be displayed on monitor screen 6 by scanning oppositely from the bottom to the top (specifically from the lower left to upper right) over the screen in contrast to the case of FIG.12.

FIG.11 shows display characters and the associated information therewith to be stored in text memory 110 in order to effect the monitor display in the self-image picture taking state II shown in FIG.14 mentioned above. Here, in the self-image picture taking state II, the arrangements of date indication 19, caution indication 20 and operation indication 21 on their respective lines are, as shown in FIG.11, the same with those in the normal picture taking state as far as the monitor screen is concerned. Nevertheless, since the scanning over the monitor screen is carried out inversely from the bottom side to the top side, the lines or rows for the display on the monitor screen are arranged and stored in a vertically inverted manner as compared to those for the normal picture taking state. On the other hand, the date indication for the output to the VTR portion will not be inverted vertically so that it is stored on the row '0' in text memory 11.

Microcomputer 10, based on the self-image picture taking mode signal from rotational angle detecting switch 11 as well as the video camera-position signal from the gravitational direction detecting means, recognizes the self-image picture taking state II, and rewrites the content in text memory 110 in accordance with the picture-taking state so as to change the character arrangement. The order of counting addresses for text memory 11 in order to read out the display characters is the same as that effected in the normal picture taking state.

In accordance with the character display example shown in FIG.11, display character data stored at an address (row '0', column '0') in text memory 110 indicates that the character is "1", the output means is "VTR portion", and the display color is "white". Display character data held at another address (row '1', column '18') designates that the character is "F", the output means is "monitor screen" and the display color is "green". Display character data held at another address (row '3', column '1') designates that the character is "B", the output means is "monitor screen", and the display color is "red". Display character data held-at still another address (row '11', column '1') designates that the character is "1", the output means is "monitor screen", and the display color is "white".

Next, the operation of superimposition controlling circuit 9 in the self-image picture taking state II will be described. Microcomputer 10 having recognized the self-image picture taking state II sends out vertically inverting commands to superimposition controlling circuit 9 in order to vertically invert the character patterns to be outputted to monitor screen driver circuit 7. The vertically inverting command accepted by command register 101 is decoded by decoder 103 so that a vertical inversion controlling signal is generated.

If the vertical inversion controlling signal is true and if the associated information with character loaded in character code register 120 designates monitor screen 6 as the output means, counter 122 providing the lower bit portion of an address in character generator ROM 121 loads m−1 as an initial value and functions in the down counting mode so as to decrease its count value one by one every time the horizontal synchronizing signal is detected. By this procedure, the character patterns arranged in the m×n matrix in character generator ROM 121 are read out from the bottom to the top by every n-bit into left-shift register 123. The data carrying the vertically inverted character patterns serialized by left-shift register 123 is processed through inversion switching selector 125 and AND-gate 127 and added to the video picture signal in video picture signal adding circuit 129. The video picture signal with the vertically inverted character patterns superimposed is inputted to monitor screen driver circuit 7 which changes the scanning direction upside down so that the display picture may be mirror-displayed. As a result, the character patterns once vertically inverted are re-inverted to display correct characters on monitor screen 6 without being vertically inverted.

In this connection, in the case where the vertical inversion controlling signal is true and if the character information with character loaded into character code register 120 designates VTR portion 8 as the output means, counter 122 counts up from an initial value '0' every time the horizontal synchronizing signal is detected. Accordingly, normal character patterns without being vertically inverted are read out from character generator ROM 121, and are superimposed as they are on the VTR recording signal.

Figure 15A:
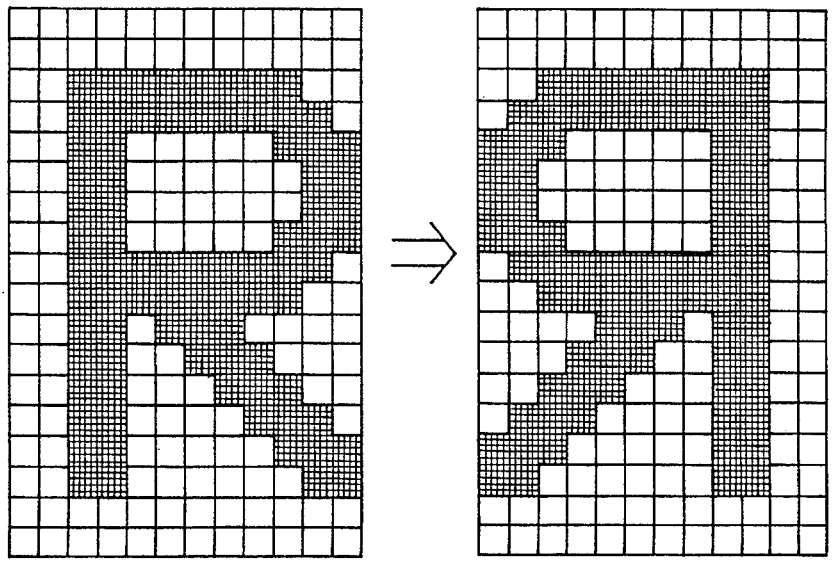
FIG.15A is an illustration showing an example of character pattern horizontally inverted.
Figure 15B:
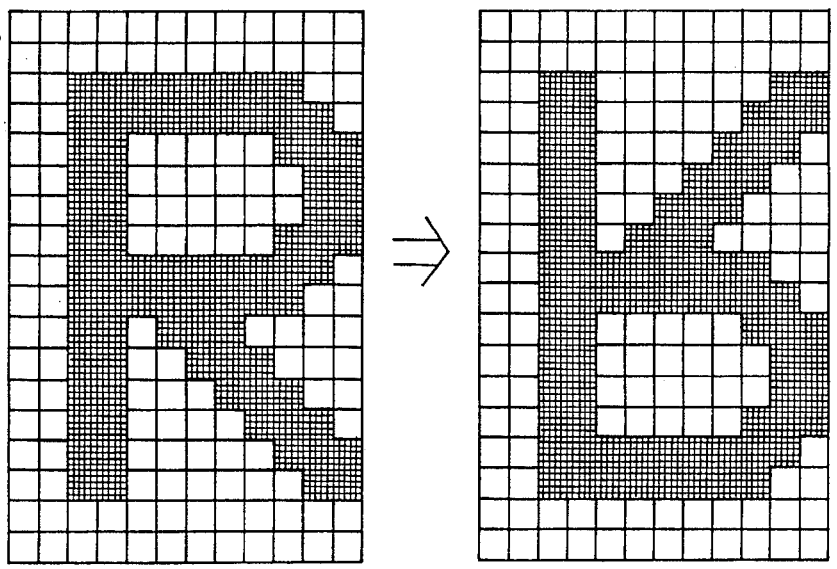
FIG.15B is an illustration showing an example of character pattern vertically inverted.

FIGS.15A and 15B are illustrative views showing horizontally inverted and vertically inverted character patterns, respectively. In the embodiment, a unit of character pattern data is 18 dots in length (m) and 12 dots in width (n). As example, inverted characters of "R" are shown. FIG.15A is an example of the character turned right-side left and FIG.15B is an example of the character turned upside down.

As has been described above, according to the present invention, even when the pickup picture is mirror-displayed on the monitor screen in the self-image picture taking mode, it is possible to effect correct character display on the monitor screen without characters being horizontally inverted.

In addition, in accordance with the present invention, even when the pickup picture is mirror-displayed on the monitor screen in the self-image picture taking mode, it is possible to superimpose character display such as date, time, etc., over the video picture signal to be recorded on a video tape and at the same time it is possible to display the characters correctly on the monitor screen without the characters being horizontally inverted.

Further, according to the present invention, even when the pickup picture is mirror-displayed on the monitor screen in the self-image picture taking mode, it is possible to display operation indication on the monitor screen in a position not away from the operation switches.

What is claimed is:

1. A monitor screen-integrated video camera comprising:
   a camera portion having a camera lens for picking up a picture of objects;
   a monitor portion having a monitor screen that displays the picture taken by said camera portion;
   a joint portion for joining said camera portion with said monitor portion in a relatively rotatable manner such that said camera lens and said monitor screen can both be oriented in the same direction toward an identical object or, in a normal picture-taking state, in different directions toward different objects;
   a monitor driver circuit which, when said monitor screen is vertically inverted as compared to its orientation in the normal picture-taking state and only when both said camera lens and said monitor screen are oriented toward an identical object, inverts a scanning direction on said monitor screen thereby allowing said monitor screen to display an horizontally inverted mirror-image of the picture taken by said camera portion;
   character code generating means for generating character codes for texts to be superimposed over said monitor screen;
   text memory for storing the character codes generated by said character code generating means;
   a character generator for generating character patterns corresponding to character codes supplied from said text memory;
   an inverting circuit for horizontally inverting a character pattern output generated from said character generator, the inverted character pattern being for superimposition on said monitor screen when said monitor screen is vertically inverted as compared to its orientation in the normal picture-taking state and both said camera lens and said monitor screen are oriented toward an identical object; and
   editing means for controlling the order of character codes generated by said character code generating means, such that an horizontally inverted order of arrayed character codes is supplied from said character code generating means to said text memory only when both said camera lens and said monitor screen are oriented toward the identical object, the arrayed characters constituting text to be displayed on said monitor screen.

2. A monitor screen-integrated video camera comprising:
   a camera portion having a camera lens for picking up a picture of objects and producing a video picture signal corresponding to the picture;
   a monitor portion having a monitor screen that displays the picture taken by said camera portion;
   a joint portion for joining said camera portion with said monitor portion in a relatively rotatable manner such that said camera lens and said monitor screen can both be oriented in the same direction toward an identical object or, in a normal picture-taking state, in different directions toward different objects;
   a monitor driver circuit which, when said monitor screen is vertically inverted as compared to its orientation in the normal picture-taking state and only when both said camera lens and said monitor screen are oriented toward an identical object, inverts a scanning direction on said monitor screen thereby allowing said monitor screen to display an horizontally inverted mirror-image of the picture taken by said camera portion;
   character code generating means for generating character codes for texts to be superimposed over said monitor screen; and
   a character generator for generating character patterns corresponding to character codes supplied from said character code generating means, said character generator providing a first character pattern output which is horizontally inverted when said monitor screen is vertically inverted as compared to its orientation of in the normal picture-taking state and which can be superimposed over the video picture signal to be outputted to said monitor screen, and a second character pattern output which can be superimposed over the video picture signal to be recorded on a video tape.

3. A monitor screen-integrated video camera comprising:
   a camera portion having a camera lens for picking up a picture of objects;
   a monitor portion having a monitor screen that displays the picture taken by said camera portion;
   a joint portion for joining said camera portion with said monitor portion in a relatively rotatable manner such that said camera lens and said monitor screen can both be oriented in the same direction toward an identical object or, in a normal picture-taking state, in different directions toward different objects;
   a monitor driver circuit which, when said monitor screen is vertically inverted as compared to its orientation in the normal picture-taking state and only when both said camera lens and said monitor screen are oriented toward an identical object, inverts a scanning direction on said monitor screen thereby allowing said monitor screen to display an horizontally inverted mirror-image of the picture taken by said camera portion; and
   a superimposition controlling circuit which is able to switch a mode of characters to be outputted to said monitor screen between a horizontally inverted character output mode when said monitor screen is vertically inverted as compared to its orientation in the normal picture-taking state, and a non-inverted character output mode and which, as the mode is changed over, modifies the vertical display position of at least one of the characters on said monitor screen.

4. A monitor screen-integrated video camera comprising:

a camera portion having a camera lens for picking up a picture of objects;

a monitor portion having a monitor screen that displays the picture taken by said camera portion;

a joint portion for joining said camera portion with said monitor portion in a relatively rotatable manner such that said camera lens and said monitor screen can both be oriented in the same direction toward an identical object or, in a normal picture-taking state in different directions toward different objects;

a monitor driver circuit which, when said camera portion is vertically inverted as compared to its orientation in the normal picture-taking state and only when both said camera lens and said monitor screen are oriented toward an identical object, inverts a scanning direction on said monitor screen thereby allowing said monitor screen to display an horizontally inverted mirror-image of the picture taken by said camera portion;

character code generating means for generating character codes for texts to be superimposed over said monitor screen;

a character generator for generating character patterns corresponding to character codes supplied from said character code generating means;

an inverting circuit for vertically inverting a character pattern output generated from said character generator; and a signal adding circuit for selectively superimposing the inverted character pattern over the picture to be displayed on said monitor screen when said camera portion is vertically inverted as compared to its orientation in the normal picture-taking state.

5. A monitor screen-integrated video camera comprising:

a camera portion having a camera lens for picking up a picture of objects and producing a video picture signal corresponding to the picture;

a monitor portion having a monitor screen that displays the picture taken by said camera portion;

a joint portion for joining said camera portion with said monitor portion in a relatively rotatable manner such that said camera lens and said monitor screen can both be oriented in the same direction toward an identical object or, in a normal picture-taking state, in different directions toward different objects;

a monitor driver circuit which, when said camera portion is vertically inverted as compared to its orientation in the normal picture-taking state and only when both said camera lens and said monitor screen are oriented toward an identical object, inverts a scanning direction on said monitor screen thereby allowing said monitor screen to display an horizontally inverted mirror-image of the picture taken by said camera portion;

character code generating means for generating character codes for texts to be superimposed over said monitor screen; and a character generator for generating character patterns corresponding to character codes supplied from said character code generating means, said character generator providing a first character pattern output which is vertically inverted when said camera portion is vertically inverted as compared to its orientation in the normal picture-taking state and which can be superimposed over the video picture signal to be outputted to said monitor screen, and a second character pattern output which can be superimposed over the video picture signal to be recorded on a video tape.

6. A monitor screen-integrated video camera comprising:

a camera portion having a camera lens for picking up a picture of objects;

a monitor portion having a monitor screen that displays the picture taken by said camera portion;

a joint portion for joining said camera portion with said monitor portion in a relatively rotatable manner such that said camera lens and said monitor screen can both be oriented in the same direction toward an identical object or, in a normal picture-taking state, in different directions toward different objects;

a monitor driver circuit which, when said camera portion is vertically inverted as compared to its orientation in the normal picture-taking state and only when both said camera lens and said monitor screen are oriented toward an identical object, inverts a scanning direction on said monitor screen thereby allowing said monitor screen to display an horizontally inverted mirror-image of the picture taken by said camera portion; and a superimposition controlling circuit which is able to switch a mode of characters to be outputted to said monitor screen between a vertically inverted character output mode when said camera portion is vertically inverted as compared to its orientation in the normal picture-taking state, and a non-inverted character output mode and which, as the mode is changed over, modifies the vertical display positions of characters on said monitor screen.

7. The monitor screen-integrated video camera of claim 2, further comprising a signal adding circuit for superimposing the first character generator output over the video picture signal only when both said camera lens and said monitor screen are oriented toward the identical object.

8. The monitor screen-integrated video camera of claim 2, further comprising a signal adding circuit for selectively superimposing the first character pattern or a non-horizontally inverted character pattern over the video picture signal provided to said monitor screen.

9. The monitor screen-integrated video camera of claim 8, wherein said signal adding circuit superimposes the first character generator output only when both said camera lens and said monitor screen are oriented in the same direction toward the identical object.

10. The monitor screen-integrated video camera of claim 3, wherein said superimposition controlling circuit switches the mode of characters to be outputted to said monitor screen in response to the position of said monitor portion relative to said camera portion.

11. The monitor screen-integrated video camera of claim 10, wherein the superimposition controlling circuit switches to the horizontally inverted character output mode only when both said camera lens and said monitor screen are oriented toward the identical object.

12. The monitor screen-integrated video camera of claim 4, wherein said signal adding circuit superimposes the inverted character pattern over the picture to be displayed on said monitor screen only when there is a predetermined orientation of the camera portion relative to the monitor portion.

13. The monitor screen-integrated video camera of claim 4, wherein said signal adding circuit superimposes the inverted character pattern over the picture to be displayed on said monitor screen only when both said camera lens and said monitor screen are oriented toward the identical object.

14. The monitor screen-integrated video camera of claim 4, wherein said signal adding circuit superimposes the non-vertically inverted character patterns generated by said character generator over the picture to be displayed on said monitor when said camera lens and said monitor screen are oriented toward different objects.

15. The monitor screen-integrated video camera of claim 5, further comprising,
   a signal adding circuit for superimposing the first character pattern over the video picture signal only when both said camera lens and said monitor screen are oriented toward the identical object.

16. The monitor screen-integrated video camera of claim 5, wherein the second character generator output is non-vertically inverted, and further comprising:
   a signal adding circuit for selectively superimposing the first character pattern or a non-vertically inverted character pattern over the video picture signal provided to said monitor screen.

17. The monitor screen-integrated video camera of claim 16, wherein said signal adding circuit superimposes the first character pattern or the non-vertically inverted character pattern over the video picture signal in response to the orientation of the camera portion relative to said monitor portion.

18. The monitor screen-integrated video camera of claim 17, further comprising:
   detecting means for detecting the orientation of said camera portion relative to said monitor portion and producing a detection signal; and
   a controller responsive to the detection signal for controlling the signal adding circuit to superimpose the first character pattern or the non-vertically inverted character pattern over the video picture signal provided to said monitor screen.

19. The monitor screen-integrated video camera of claim 6, wherein said superimposition controlling circuit switches the mode of characters to be outputted to said monitor screen in response to the position of said monitor portion relative to said camera portion.

20. The monitor screen-integrated video camera of claim 19, wherein the superimposition controlling circuit switches to the vertically inverted character output mode only when both said camera lens and said monitor screen are oriented toward the identical object.

21. A monitor screen-integrated video camera comprising:
   a camera portion having a camera lens for picking up a picture of objects and producing a picture signal corresponding to the picture;
   a monitor portion having a monitor screen for displaying the picture signal;
   a joint portion for joining said camera portion and said monitor portion such that said monitor portion can be adjustably positioned relative to said camera portion;
   character pattern generator means for generating a character pattern for superimposition over the picture signal to be displayed on the monitor screen;
   first detecting means for detecting whether a position of the monitor portion relative to the camera portion is within a predetermined range of positions, and for producing a first position signal indicating that the position of the monitor portion relative to the camera portion is within the predetermined range;
   a monitor driver circuit for controlling the direction of scanning on said monitor screen based upon the first position signal such that the picture signal is displayed on said monitor screen as an image or as an inverted image;
   second detecting means for detecting whether the orientation of the monitor portion relative to gravity is within a second predetermined range of positions, and for producing a second position signal indicating that the orientation of the monitor relative to gravity is within the second predetermined range;
   inversion means, responsive to the first and second position signals, for superimposing an inverted form of the character pattern generated by said character generator means over the picture signal to be displayed on the monitor screen.

22. The monitor screen-integrated video camera of claim 21, wherein the superimposed inverted form of the character pattern is an horizontally inverted form of the character pattern generated by said character generator means.

23. The monitor screen-integrated video camera of claim 22, wherein said inversion means includes:
   a superimposition controlling circuit having a shift register for providing the horizontally inverted character pattern; and
   a microcomputer responsive to the first position signal for determining whether the horizontally inverted character pattern is to be superimposed over the picture signal, and, if so, for controlling said superimposition controlling circuit to superimpose the horizontally inverted form of the character pattern over the picture signal to be displayed on the monitor screen.

24. The monitor screen-integrated video camera of claim 21, wherein the superimposed inverted form of the character pattern is a vertically inverted form of the character pattern generated by said character generator means.

25. The monitor screen-integrated video camera of claim 24, wherein said inversion means includes:
   a superimposition controlling circuit having a shift register for providing the vertically inverted character pattern; and
   a microcomputer responsive to the first position signal for determining whether the vertically inverted character pattern is to be superimposed over the picture signal, and, if so, for controlling said superimposition controlling circuit to superimpose the vertically inverted form of the character pattern over the picture signal to be displayed on the monitor screen.

26. The monitor screen-integrated video camera of claim 21, wherein said second detecting means includes a gravitational direction detecting means for producing the second position signal.

27. The monitor screen-integrated video camera of claim 26, wherein the first detecting means includes a position detecting switch which produces the first position signal.

28. A method for controlling the superimposition of characters in a monitor screen-integrated video camera having a camera portion and a monitor portion, the orientation of the camera portion being adjustable relative to the monitor portion, the monitor portion having a monitor screen, the method comprising the steps of:
   (a) producing a picture signal corresponding to a picture to be displayed on the monitor screen;
   (b) detecting whether the monitor screen is upright or upside down relative to gravity;
   (c) generating characters to be superimposed on the monitor screen and storing the characters at addresses identifying locations in a text memory, the addresses being dependent upon whether the monitor screen is detected to be upright or upside down in said step (b);
   (d) generating a character pattern corresponding to the generated characters stored in the text memory for superimposition over the picture signal to be displayed on the monitor screen;

(e) detecting whether the camera portion has been adjusted to an orientation within a predetermined range of orientations relative to the monitor portion;

(f) superimposing an inverted form of the character pattern of said step (d) over the picture signal to be displayed on the monitor screen only when the orientation of the camera portion relative to the monitor portion is detected to be within the predetermined range of orientations; and (g) inverting a scanning direction of the picture signal with superimposed character pattern from said step (f) onto the monitor screen when the monitor screen is detected in said step (b) to be upside down.

29. The method for controlling the superimposition of characters in a monitor screen-integrated video camera according to claim 28, wherein said step (f) further includes the step of:

(f') superimposing a non inverted form of the character pattern of said step (d) over the picture signal to be displayed on the monitor screen when the orientation of the camera portion relative to the monitor portion is detected to be not within the predetermined range of orientations.

* * * * *